(12) United States Patent
Couture

(10) Patent No.: US 6,396,172 B1
(45) Date of Patent: May 28, 2002

(54) SWITCHING APPARATUS AND METHOD FOR A SEGMENT OF AN ELECTRIC POWER LINE

(75) Inventor: Pierre Couture, Boucherville (CA)

(73) Assignee: Hydro-Quebec, Quebec (CA)

( * ) Notice: Subject to any disclaimer, the term of this patent is extended or adjusted under 35 U.S.C. 154(b) by 0 days.

(21) Appl. No.: 09/453,400

(22) Filed: Dec. 3, 1999

(30) Foreign Application Priority Data

Dec. 4, 1998 (CA) .............................................. 2253762

(51) Int. Cl.$^7$ ................................................. H05B 1/02
(52) U.S. Cl. ....................... 307/125; 307/147; 307/112; 307/113; 307/116; 307/126; 219/501
(58) Field of Search ................................. 307/125, 113, 307/116, 126, 147, 112; 219/501

(56) References Cited

U.S. PATENT DOCUMENTS 6,018,152 A    1/2000   Allaire et al.

FOREIGN PATENT DOCUMENTS

| GB | 2 058 483 | 4/1981 |
| GB | 2 324 417 | 10/1998 |
| SU | 993370 | 1/1983 |

*Primary Examiner*—Josie Ballato
*Assistant Examiner*—Robert L. Delberadinis
(74) *Attorney, Agent, or Firm*—Foley & Lardner

(57) ABSTRACT

The switching apparatus is intended to be used with a segment of an electric power line having several phase lines. Each of the phase lines has several conductors electrically insulated one from the other and connected in parallel. The conductors of each phase line are short-circuited among them at two extremities of the segment. The apparatus comprises pairs of switches connected in parallel, for selectively opening and closing the conductors of each phase line, a detecting device for detecting current operating conditions of the segment, and a controlling device for controlling the pairs of switches according to the current operating conditions of the segment. The present invention also relates to a switching method.

19 Claims, 29 Drawing Sheets

|   | 1 | 2 | 3 | 4 |
|---|---|---|---|---|
| 1 | 1 | 1 | 1 | 1 |
| 2 | 0 | 0 | 1 | 1 |
| 3 | 1 | 1 | 0 | 0 |
| 4 | 1 | 0 | 0 | 0 |
| 5 | 0 | 1 | 0 | 0 |
| 6 | 0 | 0 | 1 | 0 |
| 7 | 0 | 0 | 0 | 1 |

SWITCHING APPARATUS AND METHOD FOR A SEGMENT OF AN ELECTRIC POWER LINE

The present invention relates to switching apparatus and method for a segment of an electric power line having several phase lines. In the following text, we will refer to "phase line" to describe what is usually known by a person skilled in the art as "phase". The apparatus and method can be used among other things but not exclusively for deicing an electric power line or even for modifying in a static or dynamic manner the power flow through an electric, power line.

Known in the art, there is the U.S. Pat. No. 2,797,344 granted on Jun. 25, 1957, and naming Mr. W. T. Peirce as inventor. This patent describes an apparatus for deicing electric cables. This patent proposes that, in a power transmission line, a cable having a pair of conductors insulated from each other is provided. An electrical bridge is connected in series with one of the conductors. A means is provided for opening the electrical bridge, and another means is provided for operating the electrical bridge in response to ice accumulation on the cable. The electric bridge comprises a normally closed switch which is open by the means that responds to an ice accumulation on the cable.

Also known in the art, there is the U.S. Pat. No. 4,082,962 granted on Apr. 4, 1978, and naming as inventors Vladimir Vladimirovich BURGSDORF et al. This patent describes a device for melting the ice by direct current through conductors of an overhead power transmission line. This patent proposes the use of a rectifier that is temporarily connected to the end of one of the conductors of the line. The apparatus also comprises a grounding circuit as well as a circuit filter connected parallel to the rectifier. The circuit proposed in this patent uses a rectified current for deicing the line. For each section of the line, a rectifier, a grounding circuit and a circuit filter are used.

Also known in the art, there is the U.S. Pat. No. 4,126,792 granted on Nov. 21, 1978, and naming as inventors Georgy A. GENRIKH et al. This patent proposes a high-voltage network for areas of increased intensity of icing. This patent proposes the use of a rectifier and a switching circuit for connecting at least one conductor of the line to the rectifier so as to melt the ice by a rectified current.

Also known in the art, there is the U.S. Pat. No. 4,119,866 granted on Oct. 10, 1978, and naming as inventors Georgy Andreevich GENRIKH et al. This patent proposes the use of a direct current source and different switches connected to a segment of the line to allow a deicing of a conductor of the line by direct current.

Also known in the art, there is the U.S. Pat. No. 4,190,137 granted on Feb. 26, 1980, and naming as inventors Akira SHIMADA et al. This patent describes an apparatus for deicing trolley wires. This patent proposes to form closed loops with different segments of the trolley feeding wires and to use certain type of transformers to circulate a current through the loops which is added to the feeding current to deice the feeding wires.

Also known in the art, there is the following U.S. patents which describe different apparatuses and methods for switching lines in relation to different applications: U.S. Pat. Nos. 2,240,772; 2,852,075; 4,028,614; 4,085,338; 4,135,221; 4,322,632; 4,489,270; 4,492,880; 4,769,587; 5,124,882; 5,483,030; 5,734,256; 5,777,837; et 5,754,045.

One of the drawbacks which can be found in all of the above-mentioned switching apparatuses and methods is that none of these apparatuses and methods allows an efficient and safe switching of the conductors of a segment of an electric power line.

One of the objects of the present invention is to propose switching apparatus and method for a segment of an electric power line which allows to switch the conductors of a segment of the line without disconnecting said segment from the line, in an efficient and safe manner.

The objects, advantages and other features of the present invention will be more apparent upon the reading of the following non restrictive description of different preferred embodiments given for exemplification only in reference with the attached drawings.

Summary of the invention

According to the present invention, there is provided a switching apparatus for a segment of an electric power line having several phase lines, each of the phase lines having several conductors electrically insulated one from the other and connected in parallel for conducting a phase current, the conductors of each phase line being short-circuited among them at two ends of the segment, the apparatus comprising:

pairs of electromechanical and electronic switches connected in parallel, for selectively opening and closing the conductors of each phase line so as to conduct the corresponding phase current through one or several conductors;

detecting means for detecting current operating conditions of the segment of the electric power line; and control means for controlling the pairs of electromechanical and electronic switches according to the current operating conditions of the segment, the switches of each pair being independently controlled by control signals.

Preferably, the detecting means comprises several load cells, at least one load cell being mounted on each phase line, each load cell comprising a load sensor for measuring a load value supported by the corresponding phase line, an inclination sensor for measuring its inclination with respect to a vertical axis, a temperature sensor for measuring an ambient temperature, and a radiofrequency transmitter for transmitting signal indicating the load value, the inclination and the ambient temperature. The detecting means also include a control unit comprising a processor having first input ports for receiving signal indicating the operating positions of the switches, and second input ports for receiving signals indicating the voltages at the terminals of the pairs of switches; a radiofrequency transmitter connected to the processor for transmitting signals indicating the operating positions of the switches, and the voltages; and electric power supply means for supplying the processor and the transmitter.

Preferably, the control means comprise the processor which further includes outputs for transmitting control signals; a radiofrequency receiver connected to the processor for receiving radiofrequency control signals from which the control signals are produced; an amplifier connected to the processor for controlling the motor means according to the control signals; and the electric power supply means for further supplying the receiver and the amplifier.

According to the present invention, there is also provided a switching method for a segment of an electric power line having several phase lines, each of the phase lines having several conductors electrically insulated one from the other and connected in parallel for conducting a phase current, the conductors of each phase line being short-circuited among them at two ends of the segment, the method comprising the following steps:

(a) detecting current operating conditions of the segment of the electric power line; and (b) controlling pairs of electromechanical and electronic switches connected in parallel according to operating conditions detected in step (a) for selectively opening and closing the conductors of each phase line so as to conduct the corresponding phase current through one or several conductors, the switches of each pair being independently controlled by control signals.

DETAILED DESCRIPTION OF THE DRAWINGS

In the following description, the same reference numbers refer to similar elements. According to a first application of the present invention, we will describe how it can be used for deicing a segment of an electric power line by Joule effect.

In principle, one can deice an electric power line by Joule effect during a time period inferior to that of where ice accumulation reaches a critical value, that is a value of mechanical failure, by using the heat produced by a current inferior to the maximal current that the line can conduct, which we will refer to in the following text as nominal line current.

For a high-voltage electric power line, usually there are used for each phase line several conductors for reducing the losses by crown effect. However, for a phase line with several conductors, the nominal current of the electric power line is generally too low to allow a deicing thereof by Joule effect according to the formula $R*I^2$. To allow a deicing by Joule effect, we propose the use of an apparatus which comprises pairs of electromechanical and electronic switches, connected in series with the conductors of each phase line for concentrating the current of a phase line through one or some of its conductors. For example, for an electric power line of 735 kV with a nominal current of 2000 A, provided with four conductors by phase line, the concentration of the current through a single conductor increases by 16 the production of heat according to the formula $R*I^2$. Such an apparatus can also be used for eliminating the gallop effect in the electric power line by removing the ice from the line.

Thus, for example let us take an electric power line having x phases where each phase line has n conductors. According to the present invention, the apparatus comprises n pairs of electromechanical and electronic switches by phase line to allow the concentration of a phase current through one or some of its conductors. Of course, the conductors are insulated from one another. At each end of the segment of the electric power line, the n conductors of each phase line are short circuited.

Figure 1:
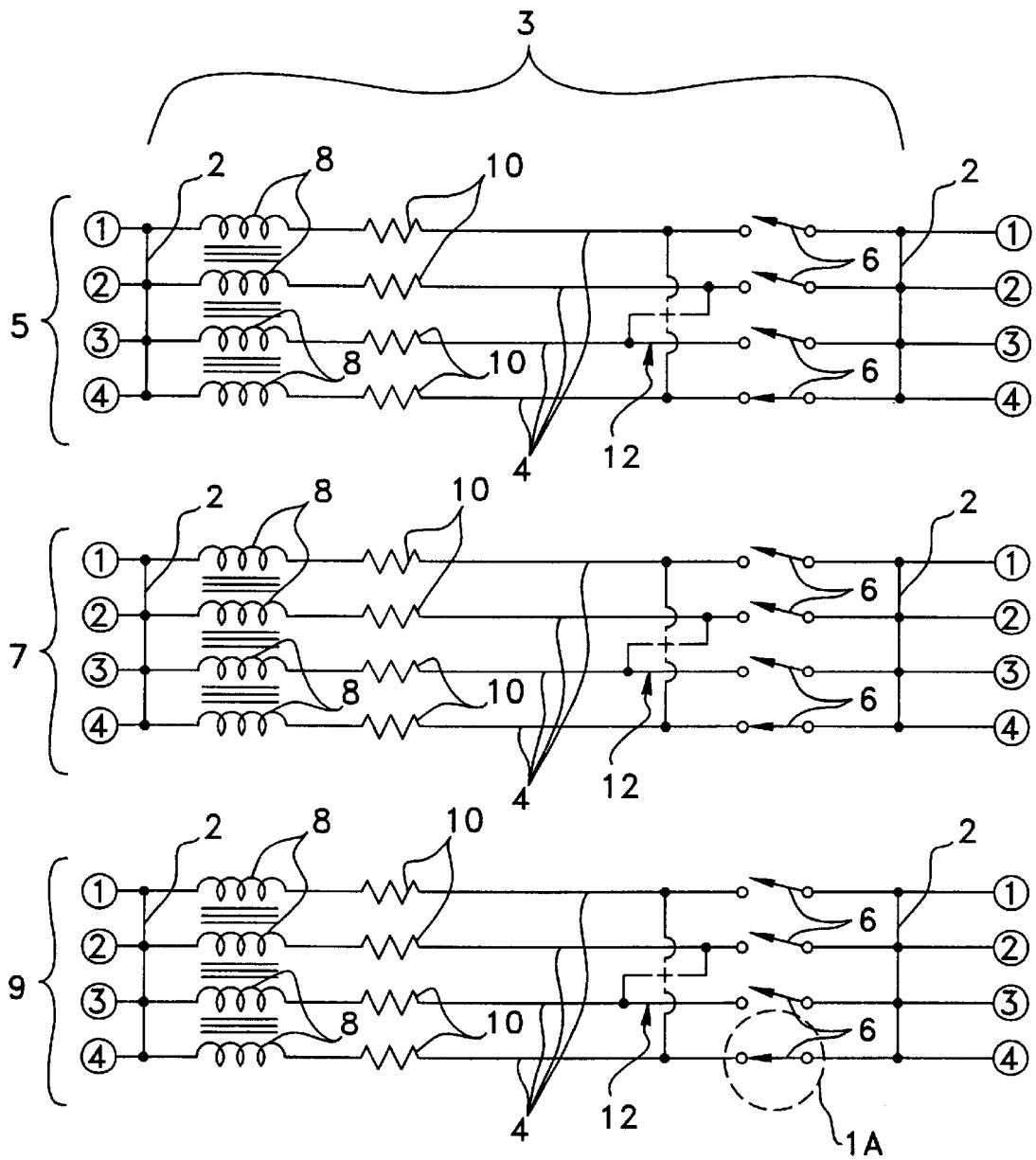
FIG. 1 is a schematic circuit diagram showing a segment of a three-phase line provided with switches according to a first embodiment of the present invention.

By referring now to FIG. 1, one can see a part of a switching apparatus for a segment 3 of an electric power line according to the present invention. The electric power line can have several phase lines. In the present case, the electric power line has three phase lines 5, 7 and 9. Each of the phase lines 5, 7 and 9 has several conductors 4 electrically insulated one from the other for conducting the phase current. The conductors of each phase line are short-circuited among them at the two extremities of the segment 3 by short circuits 2.

The apparatus according to the present invention comprises pairs of electromechanical and electric switches 6 connected in parallel, for selectively opening and closing the conductors 4 of each phase line 5, 7 or 9 so as to conduct the corresponding phase current through one or several conductors. A preferred embodiment of each pair of switches is shown in more detail in figure 1a.

The apparatus also comprises a detection device for detecting the actual operating conditions of the segment of the electric power line. This detection device is achieved in part by the circuit shown in FIG. 16 and in part by the circuit shown in FIG. 20.

The apparatus also comprises a controlling device for controlling the pairs of electromechanical and electronic switches according to the operating conditions. The switches of each pair 6 are controlled independently by control signals. A preferred embodiment of the controlling device will be described and shown in relation to FIG. 16.

Each phase line has four conductors 4 and is provided with four pairs of switches 6. Furthermore, on each phase line, an equivalent circuit of inductors and mutual inductors of line 8, and of resistors of line 10 is indicated. For discussion purposes, one neglects the capacitive effects of the line. The pairs of switches 6 of a phase line with n conductors can pass a current in 1, 2, . . . or n conductors depending on the current available for deicing purposes. For security reasons, the pairs of electromechanical and electronic switches are controlled so as to conduct the phase current of each phase line through at least one of the corresponding electromechanical switches so as to not open the line. Thus, the electromechanical switches of the pairs of switches 6 never all open simultaneously the n conductors of a phase line.

Figure 23:
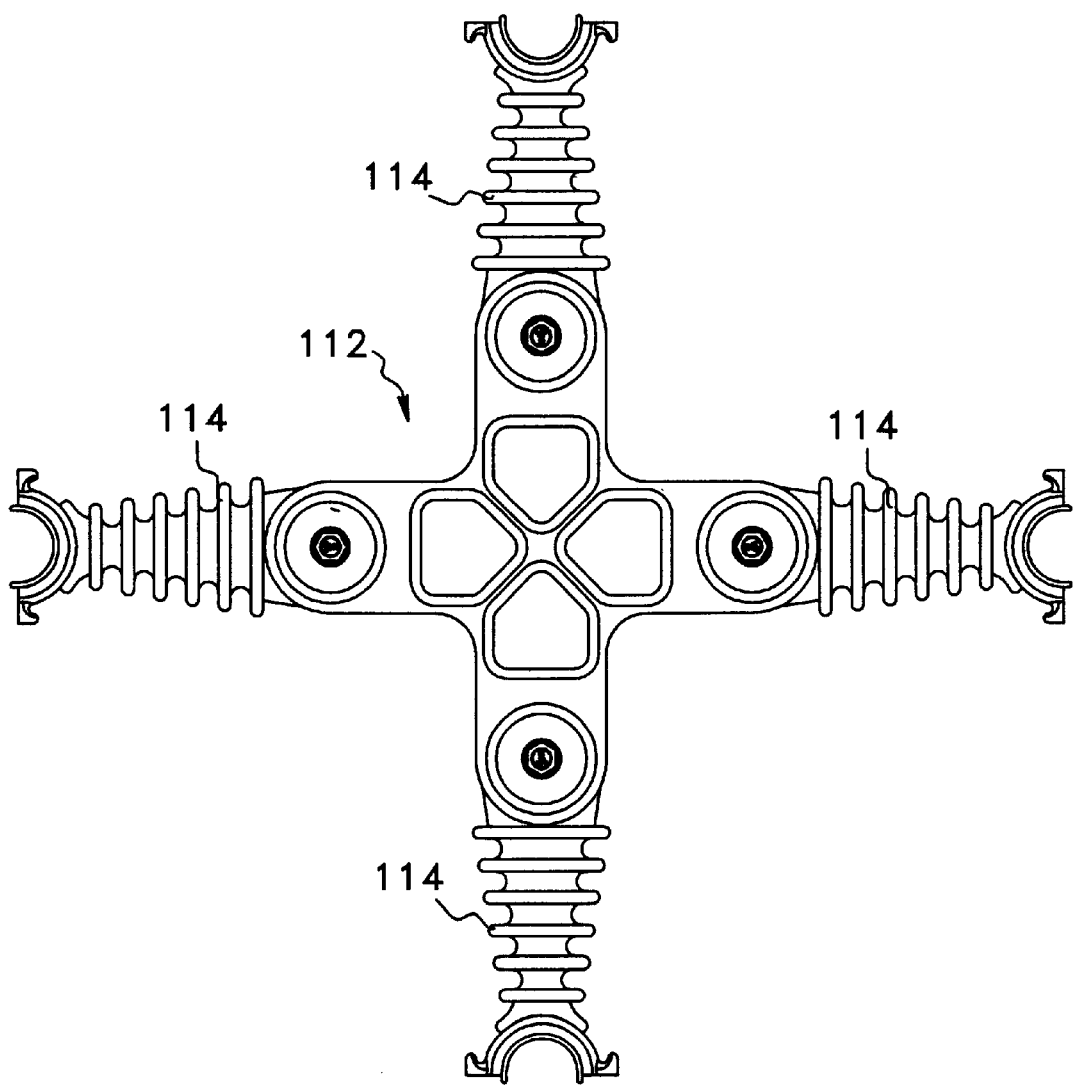
FIG. 23 is a front view of a spacer modified for an application according to the present invention.
Figure 24:
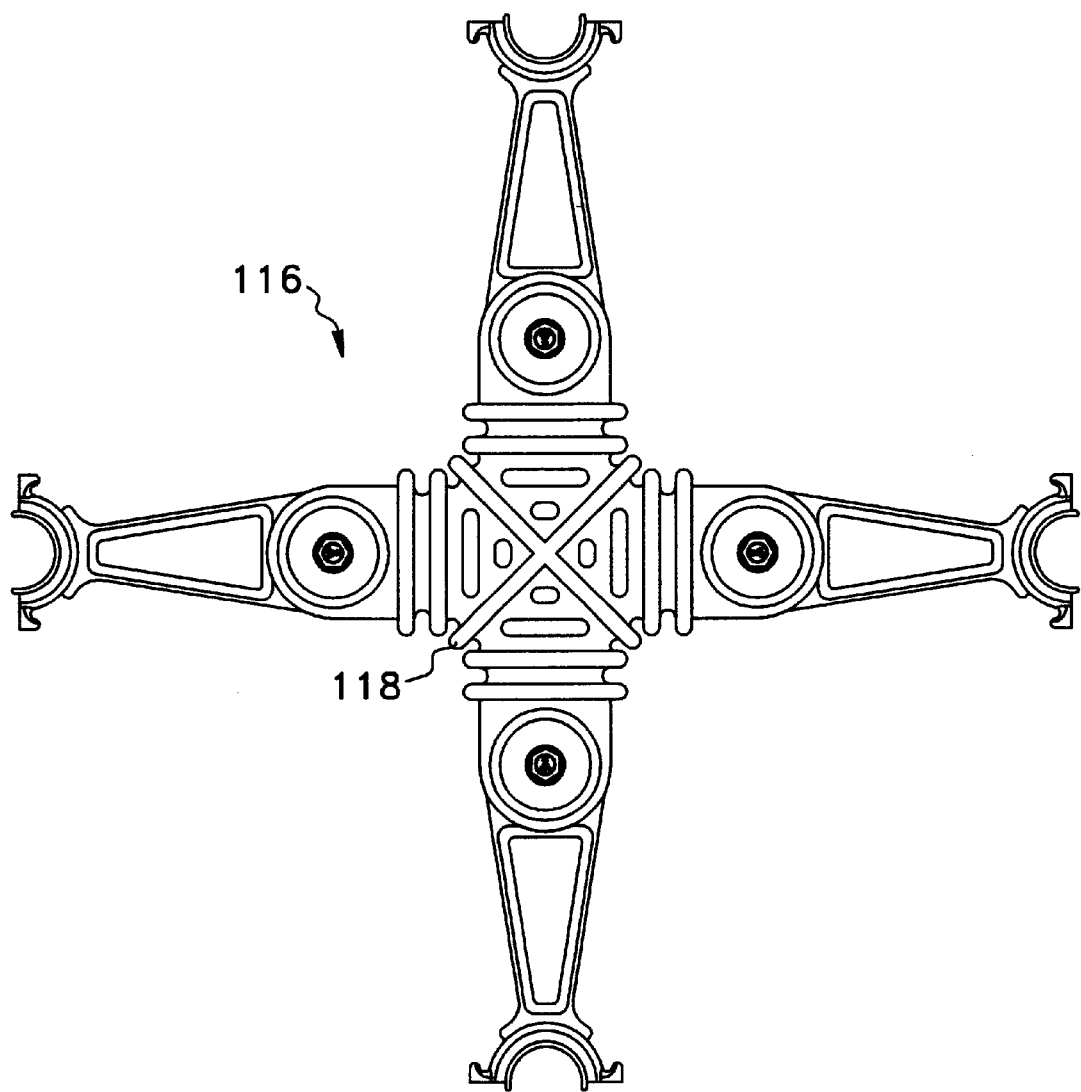
FIG. 24 is a front view of another spacer modified for an application according to the present application.

Spacers like the ones shown in FIGS. 23 and 24 are provided for holding the conductors of a same phase line at a certain distance from each other between the pylons. These spacers must be capable of electrically insulating the conductors of a same phase line from each other.

Figure 26:
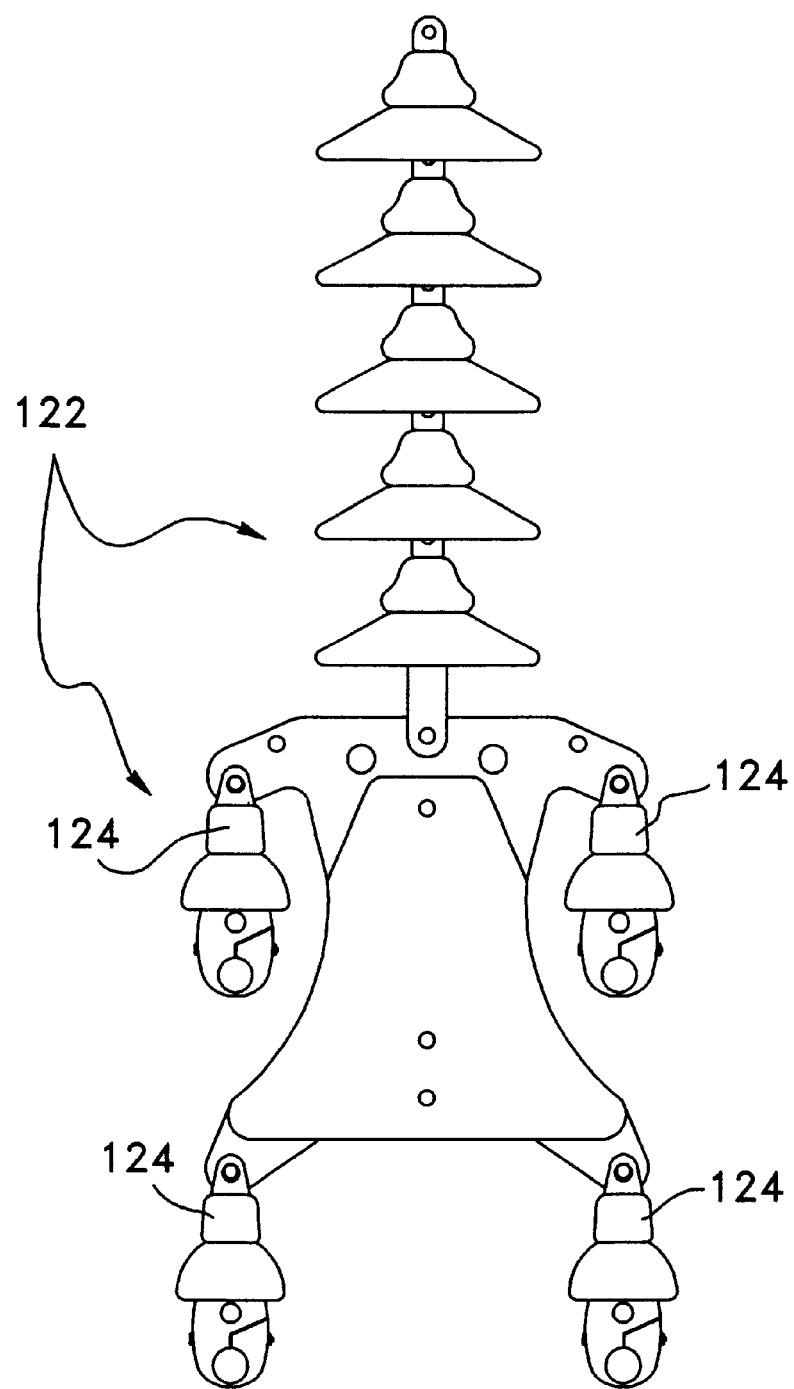
FIG. 26 is a front view of a yoke plate modified for an application according to the present invention.

Yoke plates like the one shown in FIG. 26 are mounted on the pylons and mechanically link the conductors to the insulators. These yoke plates must electrically insulate the conductors of a same phase line from each other. Standard surge arrester 12 which can be semi-conductor voltage clamps such as avalanching diodes or varistors, like the ones shown in FIG. 1 are intended for protecting the insulators from the yoke plates and from the spacers during a current overload of the line which could induce overvoltage between the conductors of the line phase.

According to a second application, the present invention can be used for managing the power flow in a segment of an electric power line by changing the series impedance of the line with the pairs of switches. For example, to change the power flow at the exit of a 735 kV power line fed by lines coming from distant dams, it suffices to modify the operating position of the pairs of switches of the switching device to modify the power flow. To that effect, one can permanently open electromechanical switches of predetermined pairs of switches associated to predetermined phase lines, and use the electronic switches of the predetermined pairs of switches for opening and closing the corresponding conductors and thus controlling in real time the power flow and stabilizing the electric network with a fine and active control.

A change of impedance on different lines will produce a different power flow. There is a great number of possible combinations according to the state in which one places the different pairs of switches. The above-mentioned application proves to be very useful for carrying out an active stabilization of the network by dynamic control of the power flow.

Figure 1A:
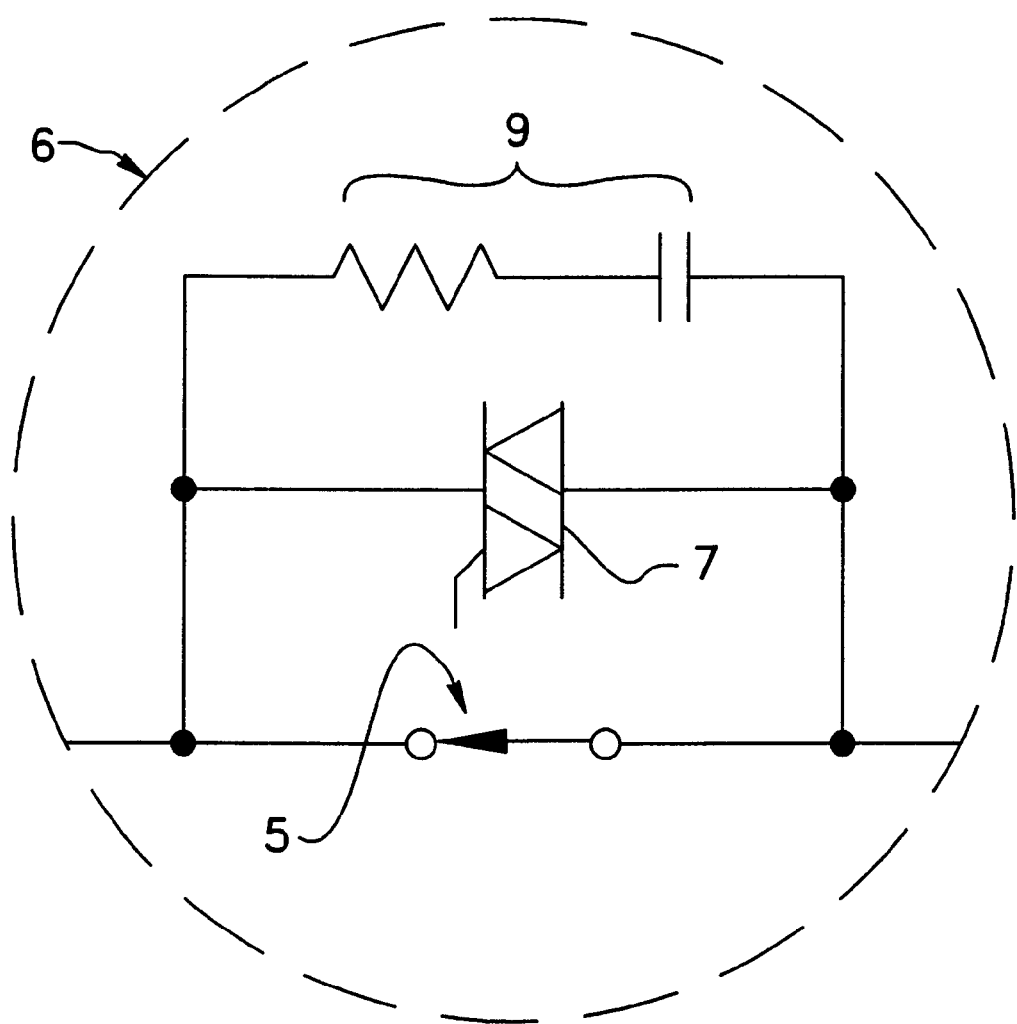
FIG 1a is a schematic circuit diagram showing a preferable embodiment to embody each of the switches 6 shown in FIG. 1, according to the present invention.

Referring to figure 1a, one can see that each pair of switches comprises an electronic switch 7 in parallel with a mechanical switch 5 for forming a pair of electromechanical and electronic switches 6. According to an embodiment, the electronic switch 7 is used for allowing the transitions of the corresponding mechanical switch and is dependent on the same. However, according to another embodiment, one can use the electronic switch for taking over from the mechanical switch 5 if the latter, due to a problem, remains in an open position for certain conductors of the phase line.

The electromechanical switch 5 is provided with a damper 9. When the pair of switches 6 must close, the electronic switch 7 closes before the mechanical switch, and when the commutator 6 must open, the mechanical switch 5 opens before the electronic switch 7. The electronic switch 7 can be for example a thyristor, triac, GTO, MOSFET, IGBT, etc.

To accomplish a control of the power flow, the electronic switch 7 must be able to be controlled by a control coming form the outside through a control receiver. The presence of a control receiver enables to change in real time the power flow of the network by dynamically changing the impedance of the lines, by uniquely controlling the electronic switches 7 after having opened the mechanical switches 5 on certain conductors. This control is carried out from a central unit that analyses the power flow and sends the appropriate signals to the different control receivers for opening or closing, in a dynamical system, the different electronic switches.

Figure 2:
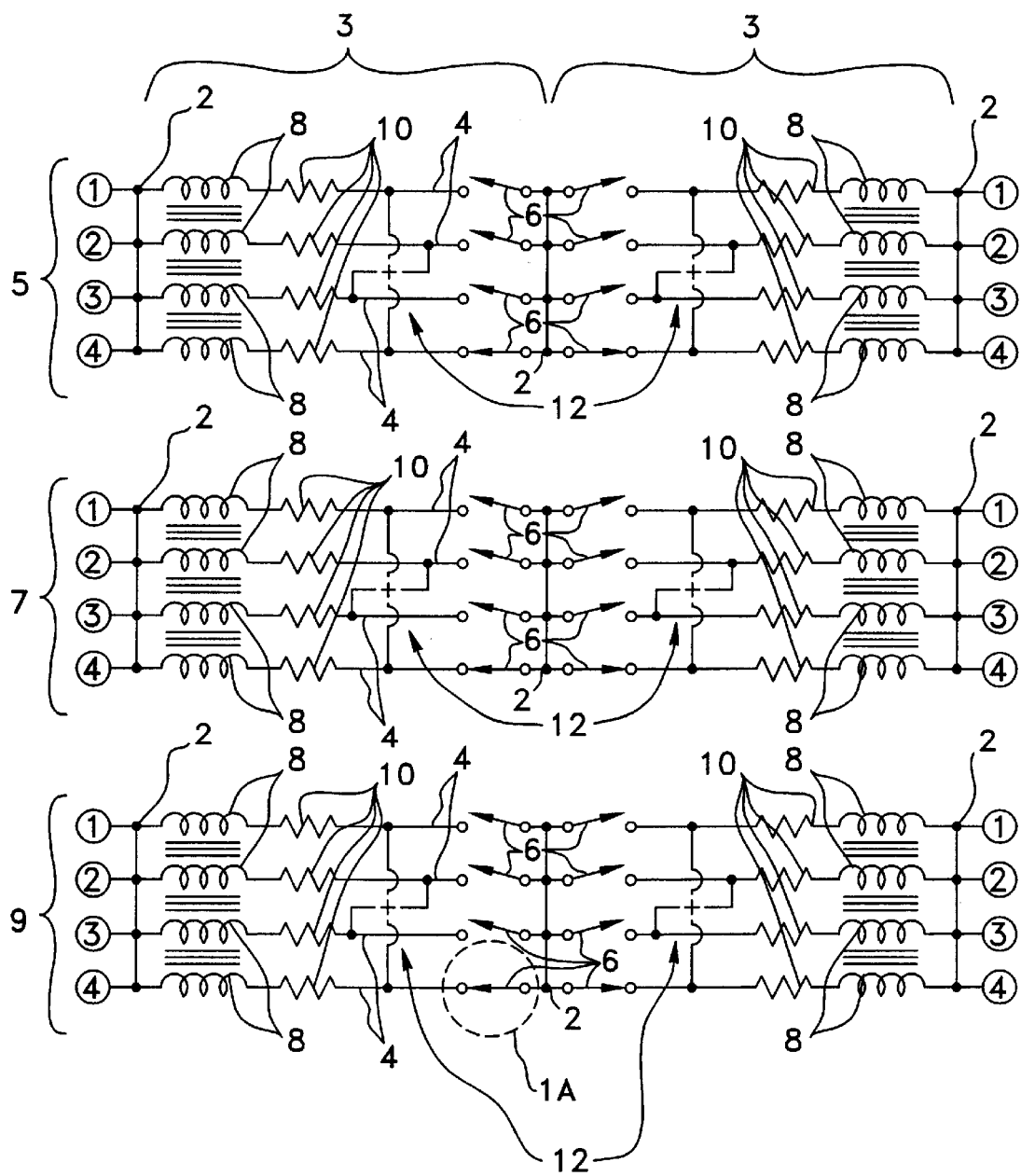
FIG. 2 is a schematic circuit diagram showing a segment of a three-phase line provided with switches according to a second preferred embodiment of the present invention.

Now referring to FIG. 2, one can see two adjacent line segments each provided with pairs of switches 6. For a given segment length, the pairs of switches 6 must be able to switch a given voltage value. The more the segment is long, the more the voltage that the pairs of switches 6 must switch and that the spacers and the yoke plates of the line segment must support, is high. For example, in FIG. 1, let us suppose that the pairs of switches 6 can switch 10,000 volts, this determines a maximum segment length value. If one wants to double the length of the segment while using pairs of switches adapted for a voltage of 10,000 volts, one can use the configuration shown in FIG. 2.

Figure 3:
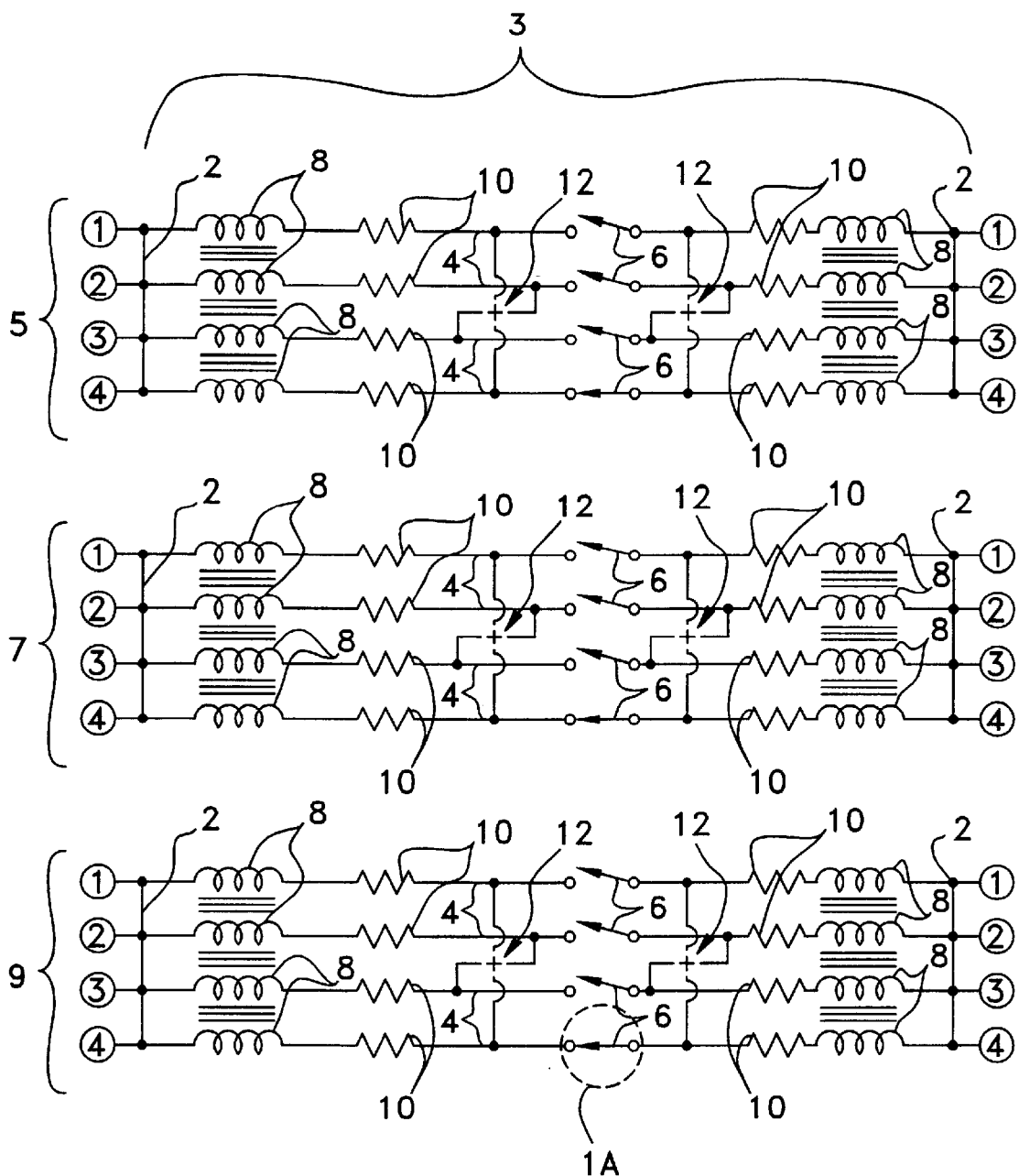
FIG. 3 is a schematic circuit diagram showing a segment of a three-phase line provided with switches according to a third embodiment of the present invention.

Referring now to FIG. 3, we suggest a configuration for doubling the length of the line segment shown in FIG. 1 by using pairs of switches 6 capable of switching a voltage of 20,000 volts. Nevertheless, in order to limit the voltage that the spacers and the yoke plates of the line segment will have to support to 10,000 volts, the pairs of switches will be arranged substantially at the middle of the segment.

Figure 4:
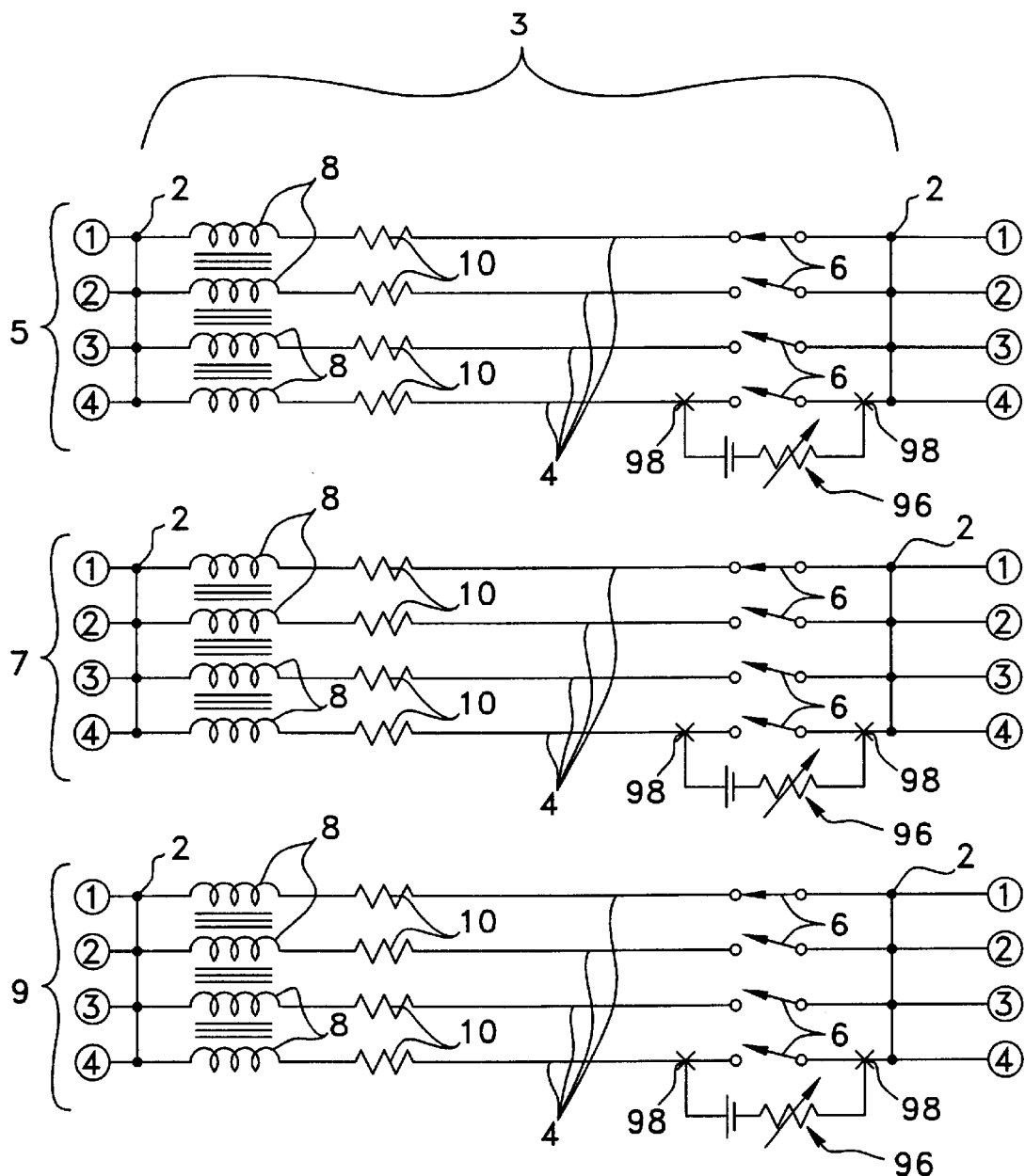
FIG. 4 is a schematic circuit diagram showing a segment of a three-phase line provided with switches according to a fourth embodiment of the present invention.
Figure 5:
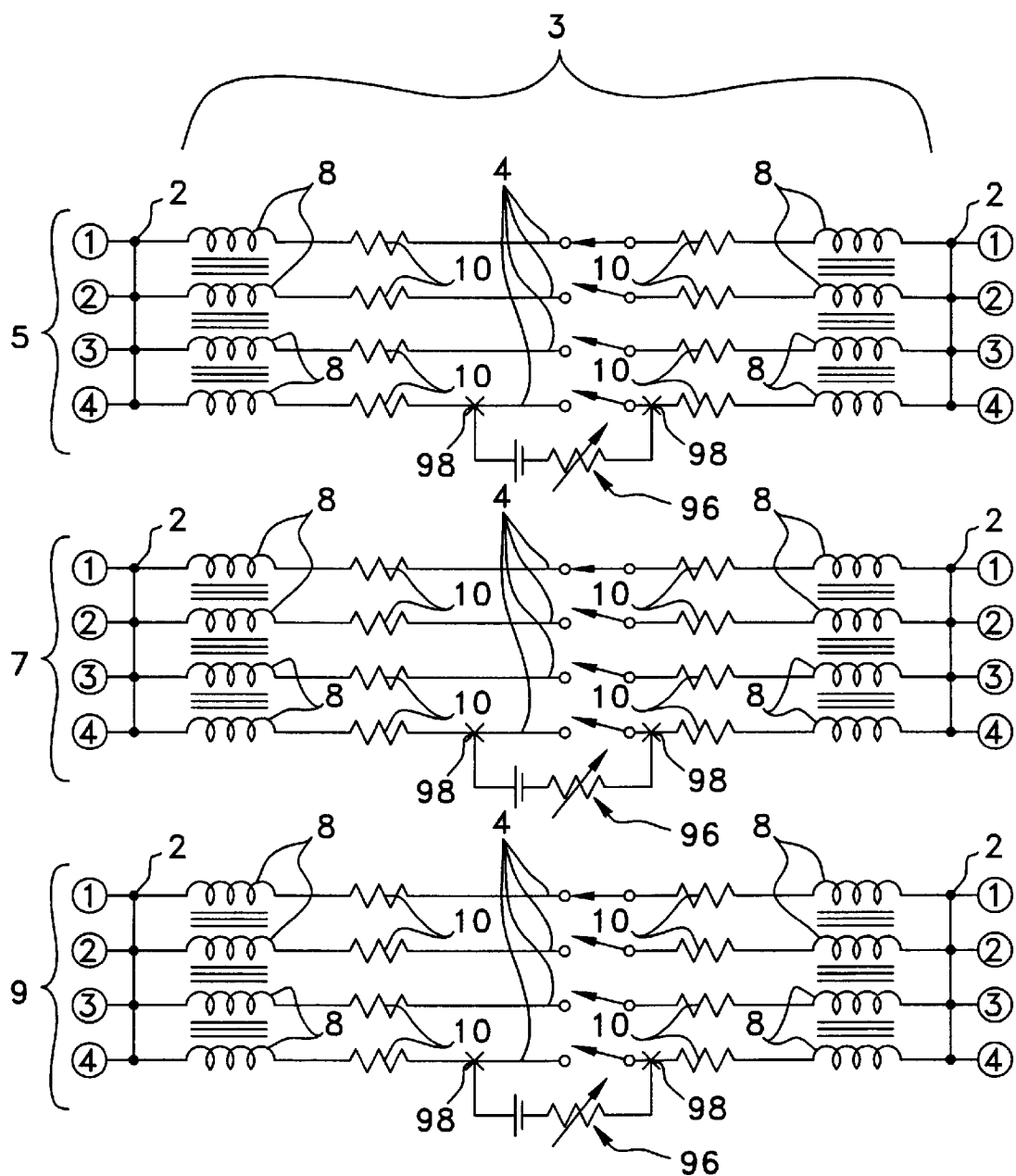
FIG. 5 is a schematic circuit diagram showing a segment of a three-phase line provided with switches according to a fifth embodiment of the present invention.

Referring now to FIGS. 4 and 5, we suggest configurations similar to those shown in FIGS. 1 and 3 for deicing a power line when the latter is disconnected. It is important to notice that the present invention can very well deice a power line when the latter is live. However, in the case where we carry out a deicing when the line is disconnected, we then use an external current source 96 for example a truck-mounted current source onto which we connect on both sides pairs of switches 6 with pins 98. By passing a current in one or some of the conductors, one deices the power line.

Figure 6:
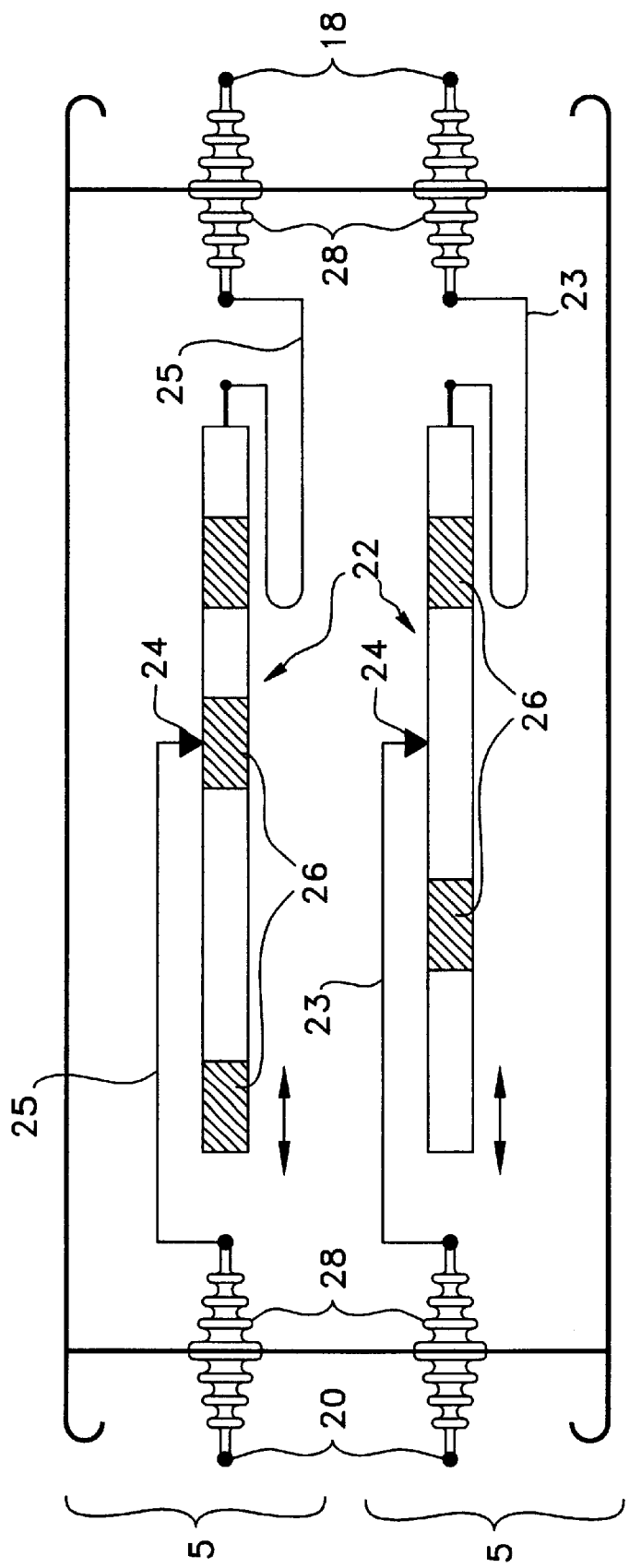
FIG. 6 is a schematic diagram showing a preferred embodiment of electromechanical switches according to the present invention.

Referring now to FIG. 6, one can see an electromechanical switching device that integrates electromechanical switches 5. Each electromechanical switch 5 is intended to be connected in series with one of the conductors of the line segment. Mobile conducting contacts 22 are respectively connected to the terminals 18. Fixed conducting contacts 24 are respectively connected to the terminals 20. The fixed conducting contacts 24 are respectively associated to the mobile conducting contacts 22. Each of the mobile conducting contacts or each of the fixed conducting contacts has a partially discontinuous conducting contact surface 26. In the present case, the mobile conducting contacts 22 are provided with said partially discontinuous contact surfaces 26.

A guiding device which is not shown in this FIG. 6 is provided for guiding the mobile conducting contacts 22 with respect to the corresponding fixed conducting contacts 24 according to given courses. The partially discontinuous contact surfaces 26 are arranged so that all along the courses there is always at least one connection between one of the mobile conducting contacts 22 and one of the fixed conducting contacts 24. Furthermore, a motor means which is not shown in this FIG. 6 is provided for moving the mobile conducting contacts 22 along their course.

The part of each mobile conducting contact that has the partially discontinuous contact surface 26 is called switching rod. The terminals 18 are linked to the mobile contacts by crossing insulators 28 that insulate the conductor 25 from the conductor 23.

Figures 7, 8:
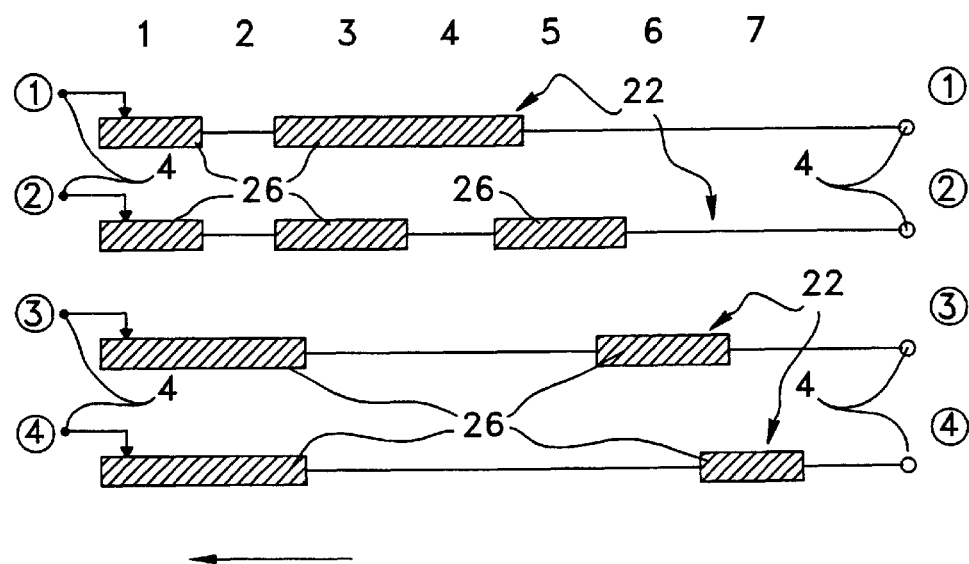
FIG. 7 is a logic diagram of different possible operating positions of an electromechanical switching device integrating four electromechanical switches according to the present invention.
FIG. 8 is a schematic illustration of a preferred embodiment of an electromechanical switching device integrating four electromechanical switches capable of embodying the logic diagram of FIG. 7 according to the present invention.

Referring now to FIG. 7, one can see an example of logic diagram showing seven possible positions of an electromechanical switching device comprising four electromechanical switches with respect to the four conductors of a phase line, according to the present invention. In the table, the digit 0 indicates that the conductor is open while the digit 1 indicates that the conductor is closed.

Referring now to FIG. 8, one can see a schematic representation of an electromechanical switching device that accomplishes the logic diagram shown in FIG. 7. One can see, according to the horizontal axis, the different positions 1 to 7 that can take the switching device. We can also see according to the vertical axes, the four conductors 4 which are numbered from 1 to 4. Whatever the position of the mobile contacts 22, at least one of the conductors of the phase line is always in position to conduct the phase current.

Figure 11:
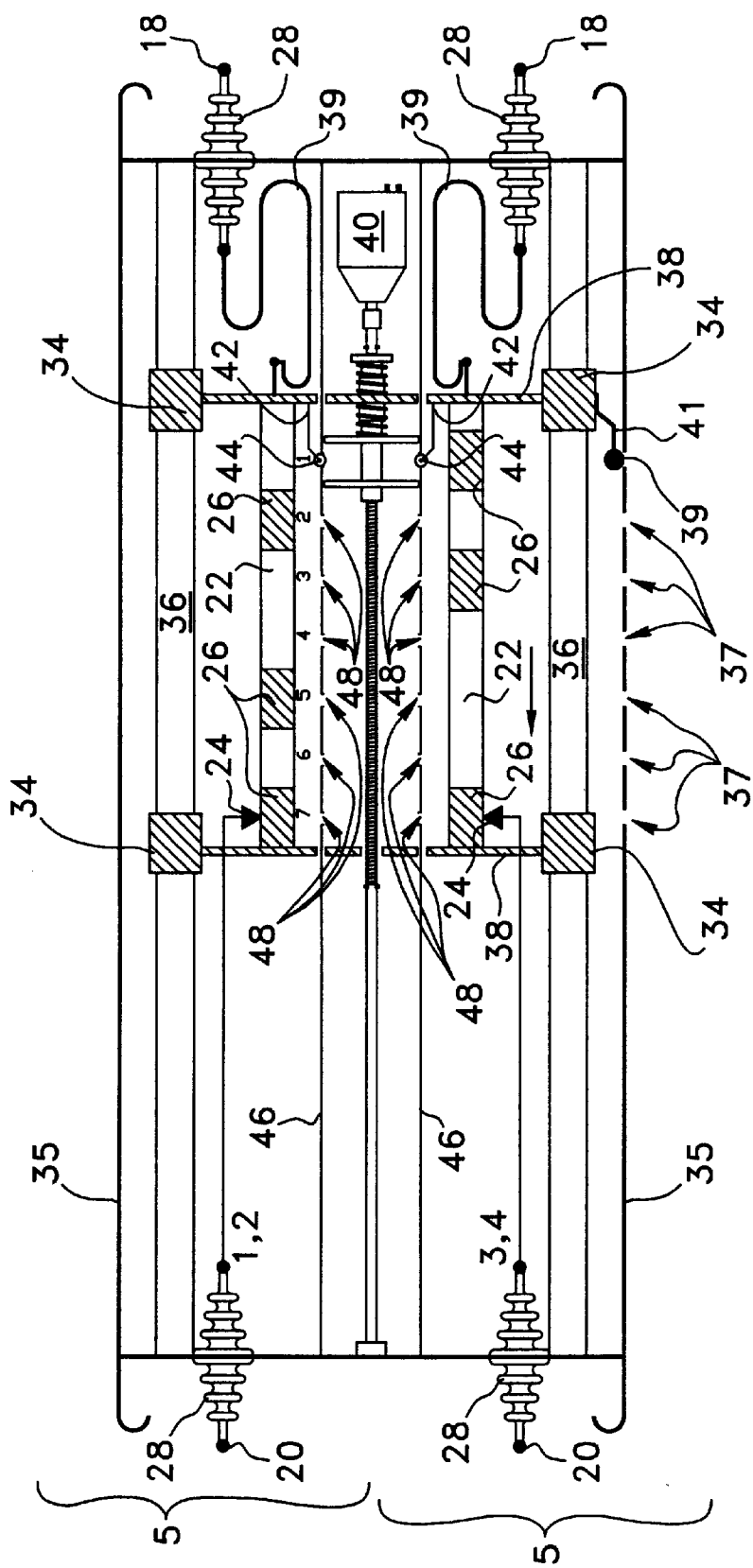
FIG. 11 is a complete side view of the switching device shown in FIG. 9 according to a first operating position.
Figure 12:
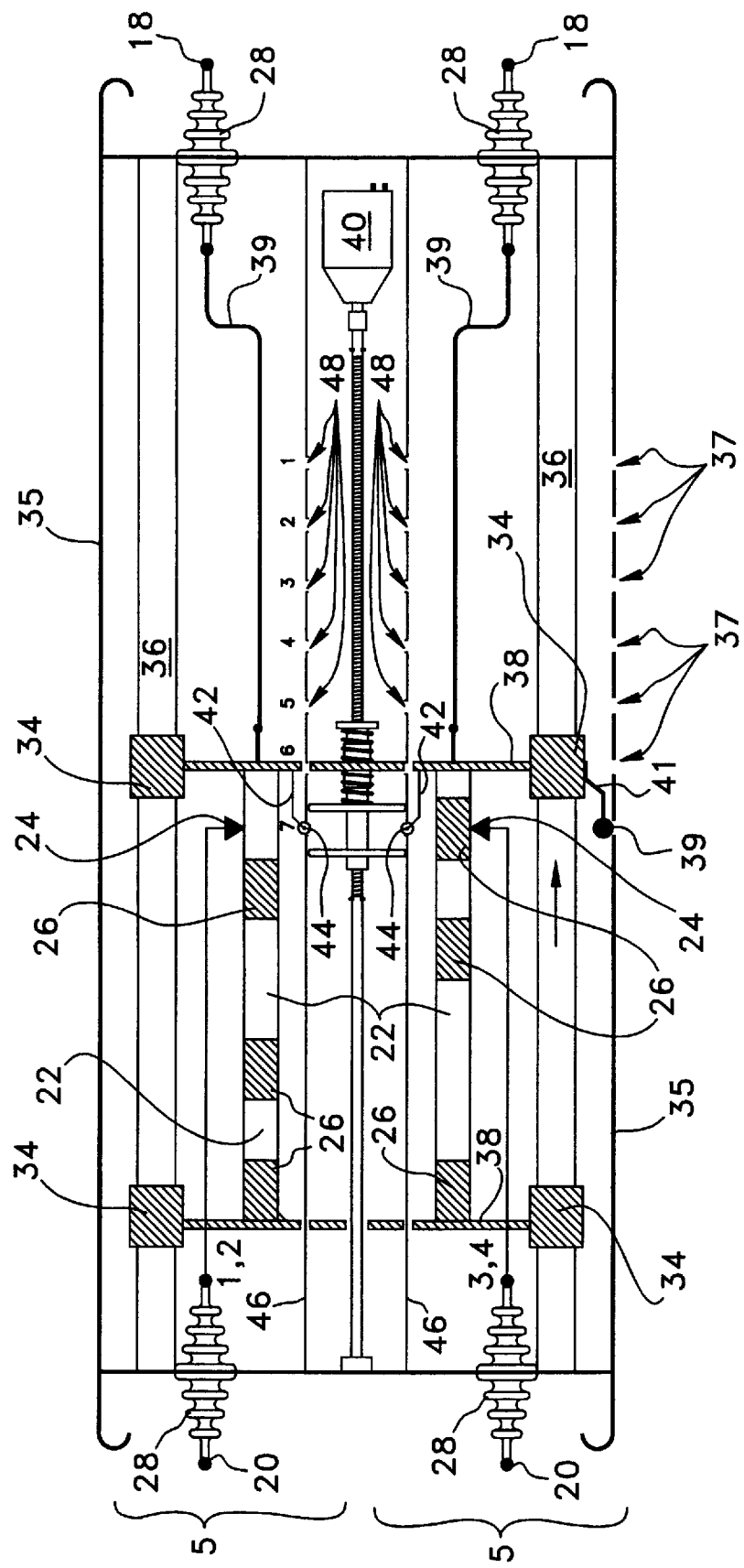
FIG. 12 is a complete side view of the switching device shown in FIG. 9 according to a second operating position.
Figure 13:
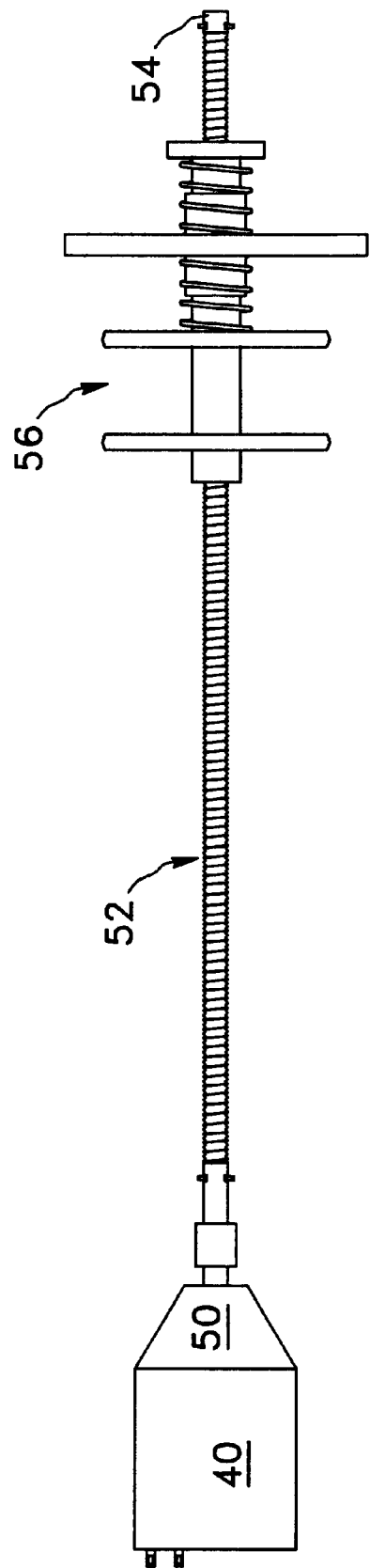
FIG. 13 is a schematic side view showing a construction detail of the embodiment shown in FIGS. 11 and 12.
Figure 14:
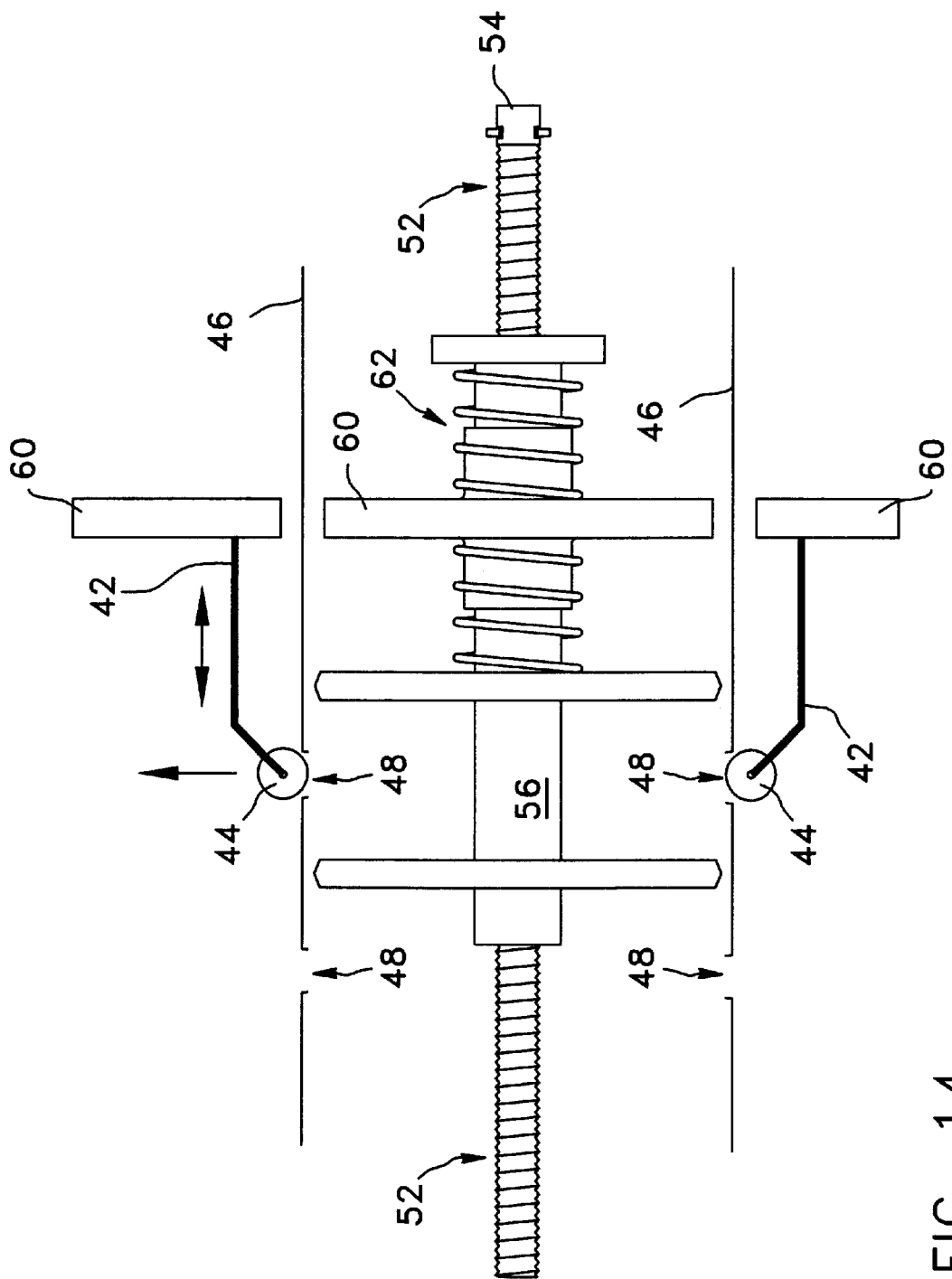
FIG. 14 is a schematic side view of a construction detail of the embodiment shown in FIGS. 11, 12 and 13.

Now referring to FIGS. 9 to 14, one can see a preferred embodiment where the electromechanical switches of a same phase line are integrated in a single electromechanical switching device. FIG. 11 completely shows the device shown in FIG. 9 in the operating position number 1 of the logic diagram shown in FIG. 7. FIG. 12 completely shows the switching device shown in FIGS. 9 and 11, in the operating position number 7 of the logic diagram shown in FIG. 7. This electromechanical switching device comprises a housing 35, terminals 20 mounted on the housing 35 and respectively connected to first sections of the conductors of the phase line (not shown), and fixed conducting contacts 24 connected to the terminals 20.

The electromechanical switching device also comprises terminals 18 mounted on the housing 35 and respectively connected to second sections of the conductors of the phase line (not shown). The electromechanical switching device also comprises a mobile carriage capable of moving with respect to the housing 35 along a course. This carriage has mobile conducting contacts 22 connected to the terminals 18. The mobile conducting contacts 22 respectively have partially discontinuous conducting surfaces 26 arranged one with respect to the others so that all along the course, at least one of the conductors of the phase line is closed by a connection between at least one of the mobile conducting contacts 22 and at least one of the fixed conducting contacts 24.

Figures 9, 10:
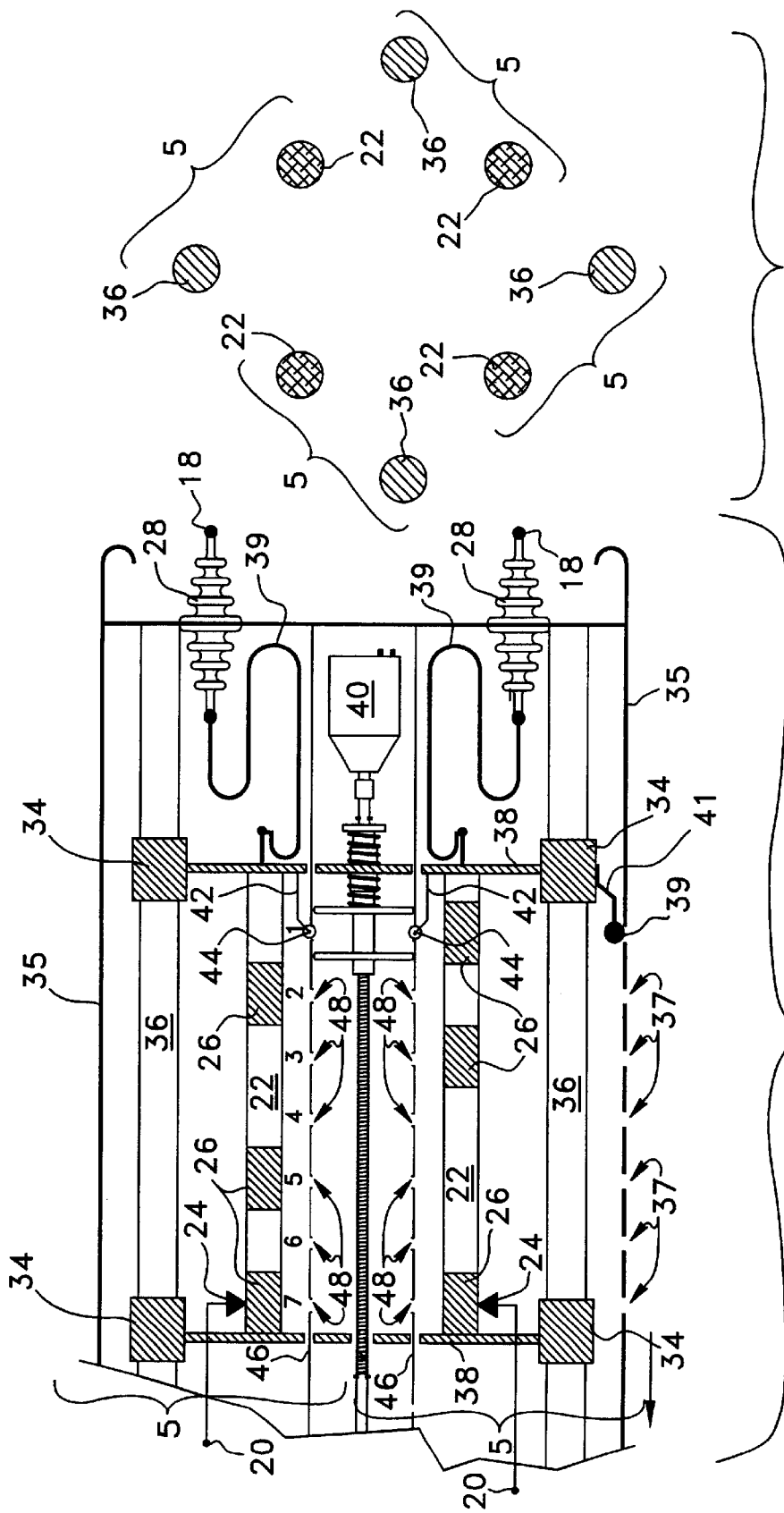
FIG. 9 is a partial and schematic side view of an electromechanical switching device according to a preferred embodiment of the present invention.
FIG. 10 is a cross sectional view of the device shown in FIG. 8, showing only certain elements of the cross sectional view.

The electromechanical switching device also comprises a guiding device for guiding the carriage along its course. This guiding device comprises rails 36 mounted on the housing 35, and linear bearings 34 mounted on the carriage and capable of sliding along the rails 36. Flexible cables 39 connect the mobile conducting contacts 22 to the terminals 18. The arrows shown in FIGS. 9, 11, and 12 show a possible moving direction of the carriage.

A motor device is provided for moving the carriage along its course. This motor device is controlled by the circuit shown in FIG. 16. This motor device comprises a motor 40 mounted on the housing. It also comprises a speed reducer 50 coupled to the motor 40. A lead screw 52 is provided. It has one of its extremities connected to the speed reducer 50 and its other extremity 54 fixed to an anchorage point of the housing. This motor device also comprises a barrel 56 capable of moving along the lead screw 52. The barrel 56 is linked to the carriage for moving it when the motor 40 is activated.

A regulating device is provided for regulating the movement of the carriage during its course. This regulating device comprises a flexible spring rod 42 having an extremity connected to the carriage and another extremity provided with a positioning component 44. The regulating device also comprises an elongated member 46 mounted on the housing 35 and provided with notches 48 positioned in relation to the course of the carriage and capable of cooperating with the positioning component 44 during the course of the carriage so as to stabilize it in different operating positions.

In operation, when the motor 40 is activated, a force tends to move the carriage but initially, the positioning component 44 resists to this displacement. Then, after a certain time when the force is sufficient to counteract the effect of the flexible spring rod 42, the positioning component 44 comes out of its notch and positions itself rapidly in the following notch. This enables a rapid displacement of the mobile contacts 22 in relation to predetermined positions.

The apparatus comprises furthermore an indicating device for indicating the actual operating position of the carriage. The indicating device comprises a flexible spring rod 41 having one of its extremities connected to the carriage and its other extremity provided with an indicating component 39. The indicating device also comprises a part of the external wall of the housing 35 that is provided with holes 37 positioned in relation to the course of the carriage. These holes 37 are capable of cooperating with the indicating component 39 during the course of the carriage so as to indicate to an observer external to the housing 35 the actual operating position of the carriage.

The indicating component 39 which can be for example a red-coloured marble is linked to the linear bearings 34 by the flexible spring rod 41. When the linear bearing moves, it carries with it the marble that then blocks one of the openings 37 to indicate to an observer external to the housing the position of the mobile contacts 22.

Now referring more specifically to FIGS. 9 and 10, one can see that the electromechanical switching device has four electromechanical switches 5. FIG. 10 shows a partial and schematic cross-sectional view of the electromechanical switching device in which one can see the arrangement of the conducting rods 22 with respect to the rails 36. An electric insulator 38 is provided for insulating the switching rods from each other.

Figure 15:
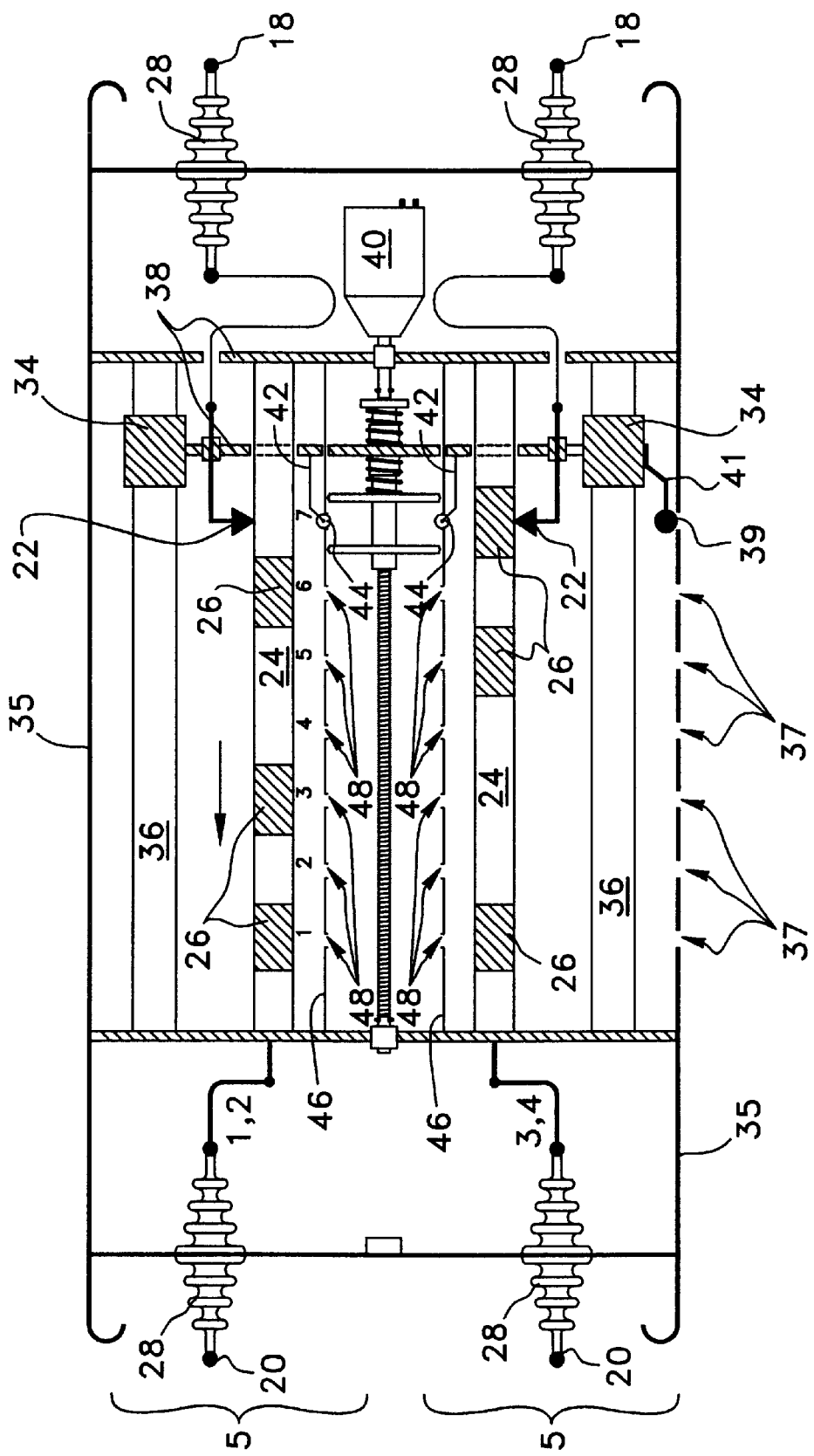
FIG. 15 is a side view of another electromechanical switching device according to a preferred embodiment of the present invention.

Referring now to FIG. 15, one can see according to another preferred embodiment how four electromechanical switches of a same phase line can be integrated in an electromechanical switching device. This electromechanical switching device comprises a housing 35, terminals 18 mounted on the housing 35 and respectively connected to first sections of the conductors of the phase line (not shown), and a mobile carriage capable of moving with respect to the housing 35 along a course.

The carriage comprises mobile conducting contacts 22 connected to the terminals 18. The electromechanical switching device also comprises terminals 20 mounted on the housing and respectively connected to second sections of the conductors of the phase line (not shown). Furthermore, the electromechanical switching device comprises fixed conducting contacts 24 connected to the terminals 20. The fixed conducting contacts 24 have respectively partially discontinuous conducting surfaces 26 arranged one with respect to the others so that all along the course of the carriage at least one of the conductors of the phase line is closed. This electromechanical switching device also comprises a guiding device and a motor device similar to those shown in FIGS. 9 to 14.

Thus, as can be seen in the embodiment shown in FIG. 15, the contact surfaces 26 are on the fixed contacts 24 and the mobile contacts 22 are achieved by cursors which are linked to the linear bearings 34 guided by the rails 36. Insulators 38 are provided for insulating the two mobile contacts 22, one with respect to the other.

Figure 16:
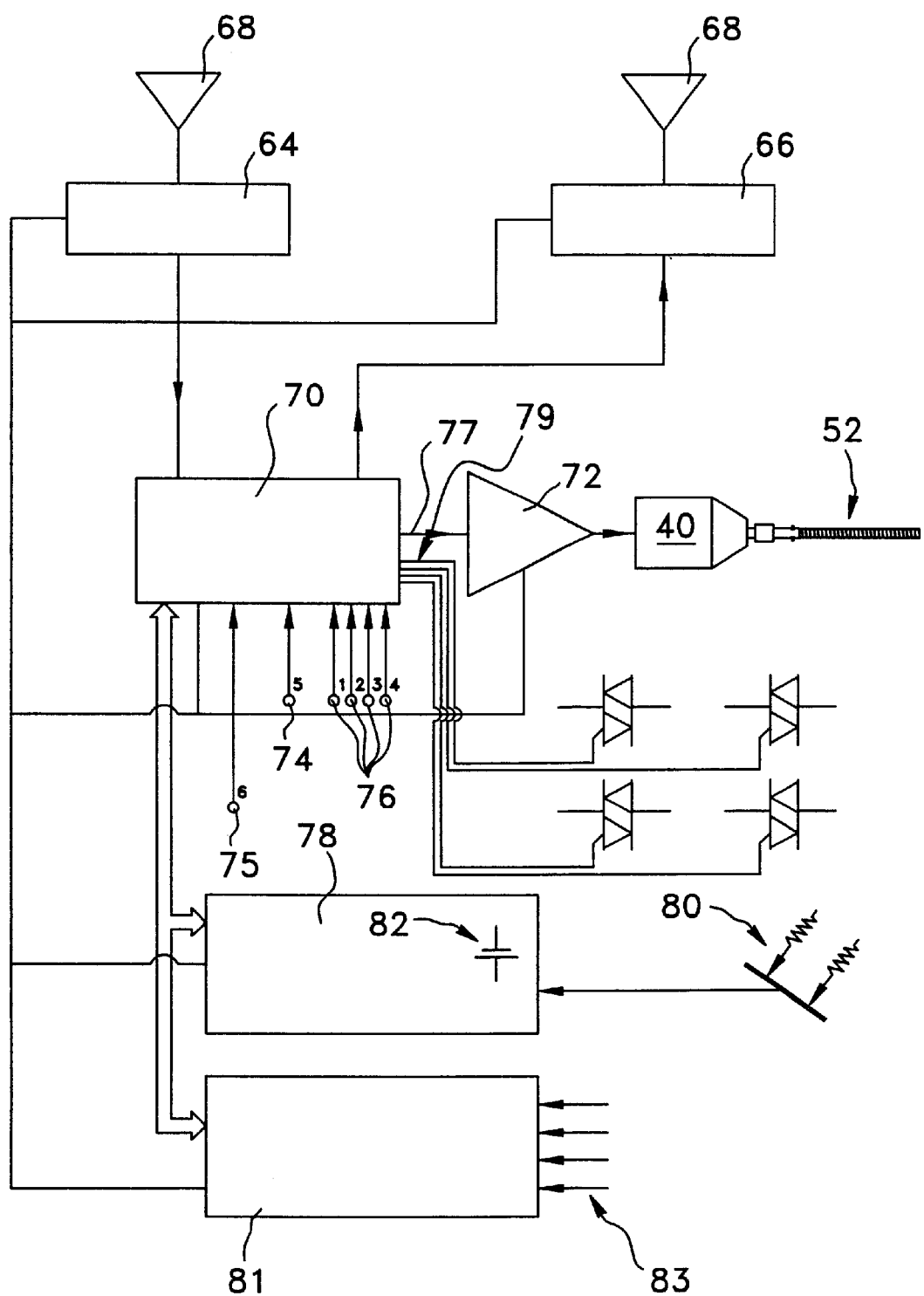
FIG. 16 is a block diagram of a unit which comprises a control device and a part of the detecting device according to the present invention.

Now referring to FIG. 16, one can see a preferred embodiment of a unit which comprises the control device and a part of the detecting device. The unit comprises a processor 70 having a first input port 74 for receiving signals indicating the operating positions of the switches, second input ports 76 for receiving signals indicating the voltages at the terminals of the pairs of switches, and outputs 77 and 79 for providing control signals. The device also comprises a radiofrequency transmitter 66 connected to the processor 70 for transmitting signals indicating the operating positions of the switches, and the voltages at the terminals of the pairs of switches. A radiofrequency receiver 64 is also provided. The receiver 64 and the transmitter 66 are respectively provided with antennae 68. The receiver 64 is connected to the processor 70 for receiving radiofrequency control signals from which the control signals are produced. The unit also comprises an amplifier 72 connected to the processor 70 for controlling the motor 40 according to the control signals.

A power supply device is provided for supplying the processor 70, the receiver 64, the transmitter 66 and the amplifier 72. This power supply device comprises a first electric power supply 78 having a battery 82 and a solar panel 80 connected to the battery 82. This power supply device also comprises a second electric power supply 81 connected in parallel to the first electric power supply 78, and having inputs 83 connected to the conductors of a phase line. Thus, when one of the conductors is open, the supply can be provided from this conductor by means of the supply 81 via one of the inputs 83.

The processor 70 also comprises a communication port 75 linked to a rev-counter of the lead screw 52 to know its position. The port 74 of the processor 70 serves to receive a signal representing the position of the carriage of the electromechanical switching device that integrates the electromechanical switches for a same phase line. The position of the carriage is representative of the position of each of the electromechanical switches that are associated with it.

The receiver 64 and the transmitter 66 respectively enable to receive and transmit radiofrequency signals. The pairs of switches are activated according to the received radiofrequency signals. The radiofrequency signals transmitted by the transmitter 66 enable to confirm the reception of the radiofrequency control signals and eventually the execution of the controls carried out. The receiver 64 is permanently capable of receiving the radiofrequency signals from afar which are coded.

According to a preferred way of proceeding, one transmits a first code containing an identification of a pair of switches, a time window and also a password. Then, one transmits a second code containing an identification of the pair of switches to be activated, the control to be carried out, an information relative to the time at which said control must be carried out as well as the password. The control associated to the second code is only carried out if the password of the second code corresponds to that of the first code, and if the execution time of the second code is within the time window defined by the first code.

The transmitter 66 that functions intermittently or continuously confirms the received control, the execution time of the control, the state of the batteries and the voltage in the conductors. The information relative to the voltage at the terminals of an open conductor enables at the same time to determine the current that passes through the other conductors that are closed. A zone receiver and transmitter which are not illustrated are also provided for receiving data from load cells (shown in FIGS. 18, 19 and 20) which are mounted on the phase lines and retransmit the data received at a distance from the load cells to a central control post (not shown).

According to a preferred operating mode, the transmitter of the load cell can be operated intermittently for transmitting different data on demand or at a fixed period. For example, a transmitter of 5W could function during one millisecond every fifteen minutes.

Figure 17:
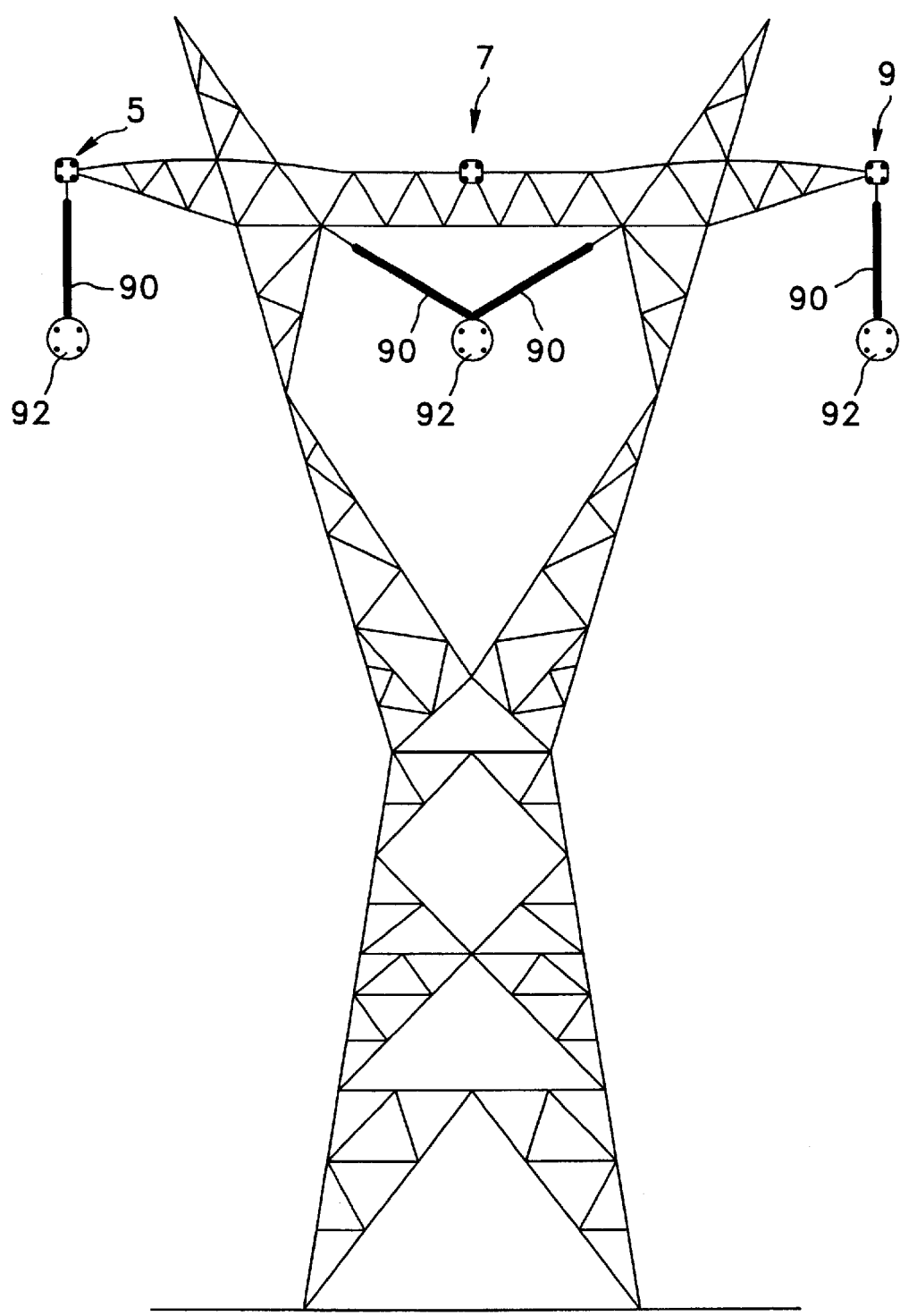
FIG. 17 is a front view of a pylon supporting an electric power line on which modules according to the present invention are mounted.

Referring now to FIG. 17, one can see a front view of a pylon provided with modules 92 which are supported by supports 90. Each module 92 comprises the unit shown in FIG. 16 and an electromechanical switching device like the one shown in FIG. 11 or 15.

Figure 18:
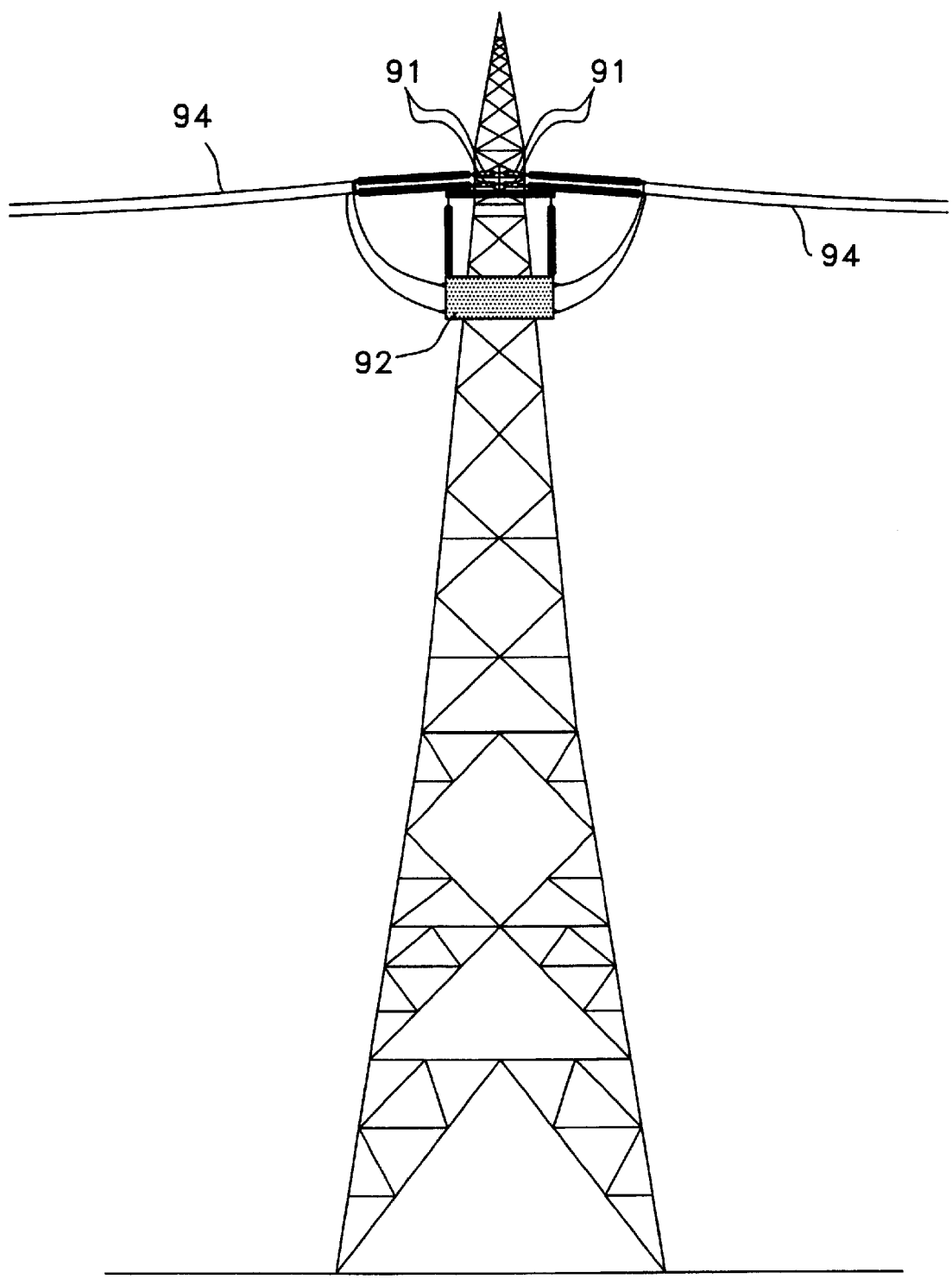
FIG. 18 is a side view of the pylon shown in FIG. 17.

Referring now to FIG. 18, one can see a side view of the pylon shown in FIG. 17. On this figure, one can see that the modules 92 do not have to support the mechanical tension which is present in the transmission line 94. Furthermore, one can see four load cells 91 which are mounted on the phase lines.

Figure 19:
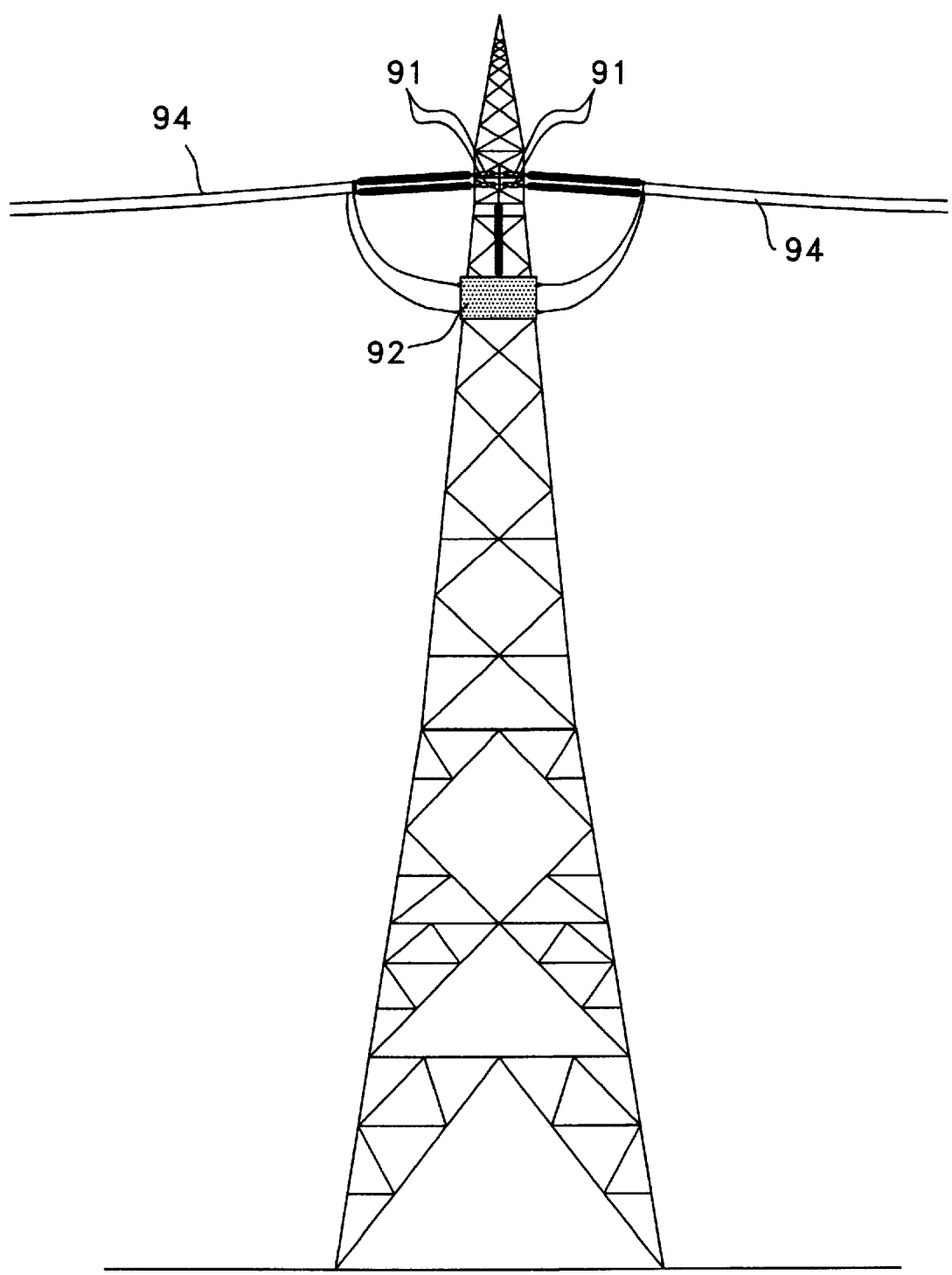
FIG. 19 is a side view of a pylon, showing an alternative embodiment to the one shown in FIG. 18.

Referring now to FIG. 19, one can see a side view of an electric pylon where a second way of holding up the modules 92 is shown. Also, one can see on this figure four load cells 91 which are mounted on the phase lines.

Figure 20:
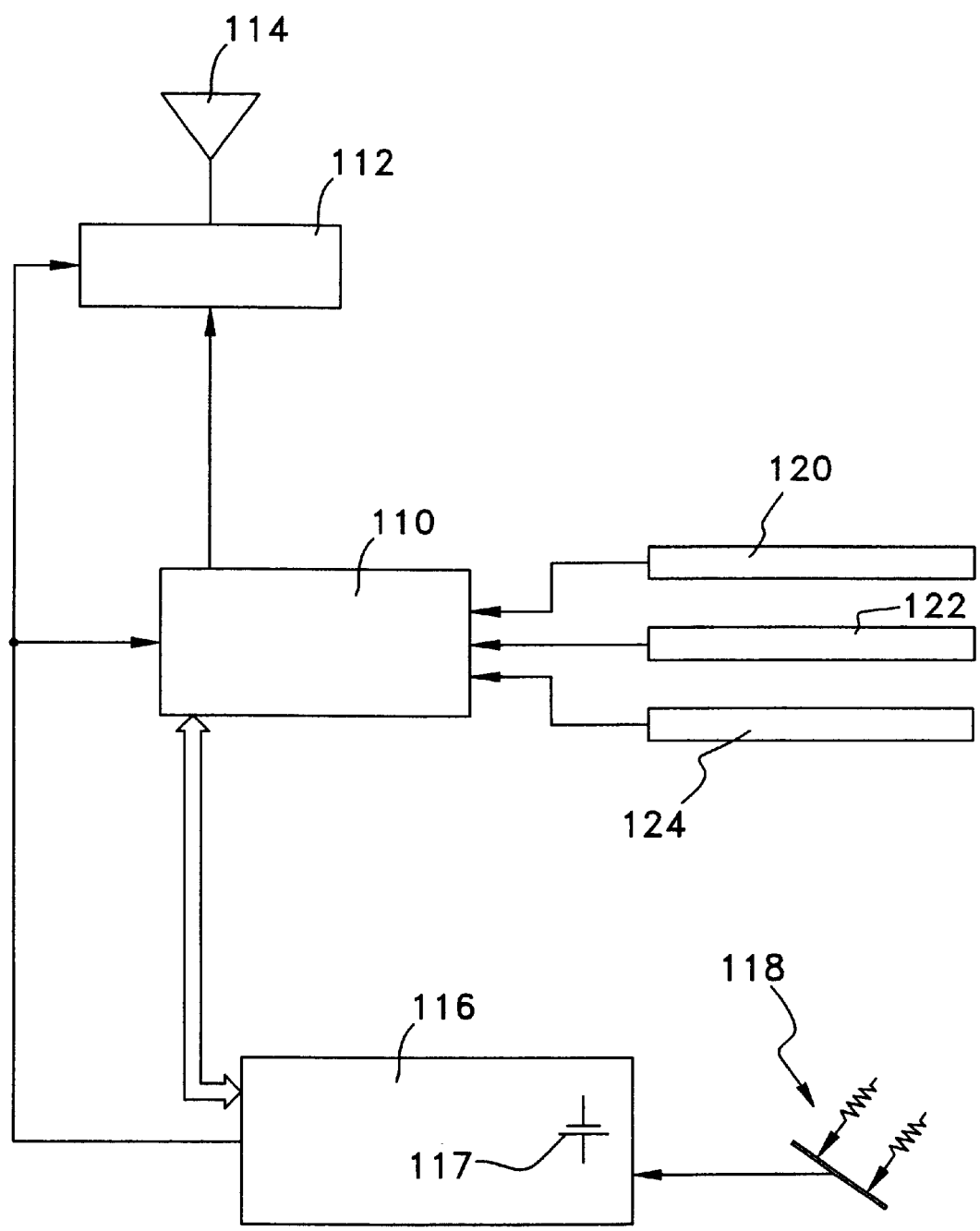
FIG. 20 is a block diagram of a load cell which embodies the other part of the detecting device according to the present invention.

Referring now to FIG. 20, one can see a block diagram of a load cell. Preferably, a part of the detecting device is located in the circuit shown in FIG. 16, and the other part is accomplished by the load cells. Each load cell preferably comprises a processor 110, a power supply 116 provided with at least one battery 117, a solar panel 118 linked to the power supply 116, a transmitter 112 provided with an antenna 114, a load sensor 120, an inclination sensor 122 and a temperature sensor 124.

The load sensor 120 is for measuring a load value supported by the corresponding phase line. The inclination sensor 122 is for measuring the inclination of the load cell with respect to a vertical axis. The temperature sensor 124 is for measuring an ambient temperature. The radiofrequency transmitter 112 is for transmitting signals indicating the value of the load, the inclination and the ambient temperature.

The solar panel 118 and the battery 117 supply the load cell. The load cells are used to measure the ice load. They also enable to measure the parameters of the resonance of the line. From the load cells, one determines to put into service the deicing system or confirm the success of a deicing operation. Many load cells can be associated to one line segment. The information transmitted by the different load cells is transmitted to a central post (not shown) which controls the modules 92 shown in FIGS. 17, 18 and 19.

Referring now to FIGS. 1, 16 and 20, we will describe a switching method according to the present invention which comprises the following steps (a) detecting current operating conditions of the segment of the electric power line, and (b) controlling pairs of electromechanical switches 6 according to the operating conditions detected in step (a) for selectively opening and closing the conductors of each phase line so as to conduct the corresponding phase current through one or several conductors. Control signals are provided so that the switches of each pair may be controlled independently.

Preferably, one can control the pairs of switches so that during a closing of a pair of switches, one produces control signals causing a closing of the electronic switch before a closing of the electromechanical switch, and during an opening of a pair of switches, producing control signals causing an opening of the electromechanical switch before an opening of the electronic switch. This method enables to perform the switching in a secure manner.

Step (a) of the method according to the present invention comprises preferably the following steps (i) detecting operating positions of the switches, (ii) measuring voltages at the terminals of the pairs of switches, (iii) measuring for each phase line a load value that is supported by means of load cells 92, inclinations of the load cells 91 with respect to a vertical axis, and temperatures ambient to the load cells 91, (iv) transmitting radiofrequency signals indicating the operating positions of the switches, the voltages, the load values, the inclinations and the ambient temperatures, (v) following step (iv), receiving by means of the receiver 64 radiofrequency control signals, and (vi) producing the control signals according to the radiofrequency control signals. The control signals are generated at the outputs 77 and 79.

Figure 21:
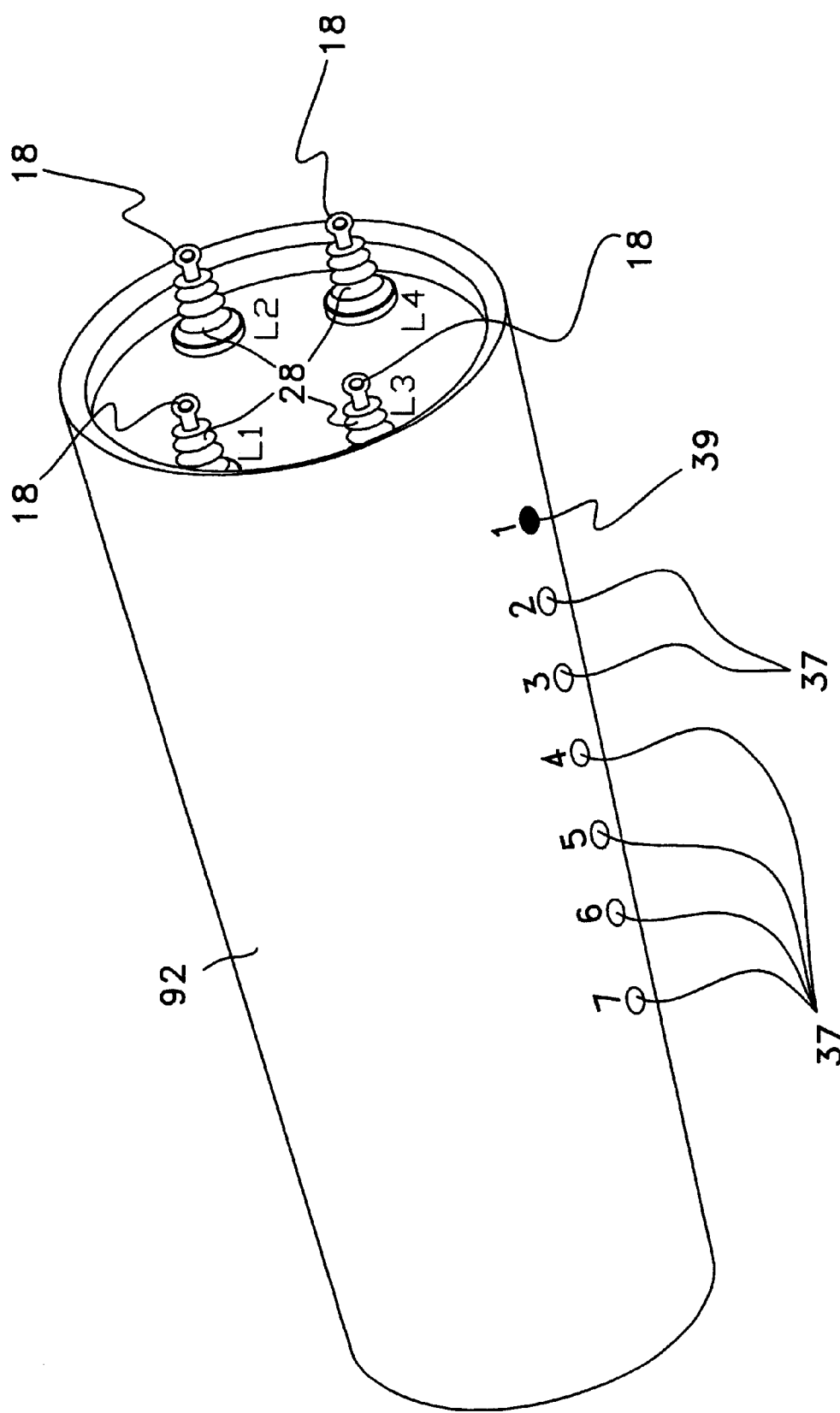
FIG. 21 is a perspective view of one of the module shown in FIG. 17 according to the present invention.

Referring now to FIG. 21, one can see a perspective view of one of the modules 92 shown in FIGS. 17, 18 and 19. One can see the terminals 18 of the switching device , as well as the crossing insulators 28. One can also see the openings 37 as well as the marble 39 which serves to indicate the position of the mobile contacts to a technician located on site.

Figure 22:
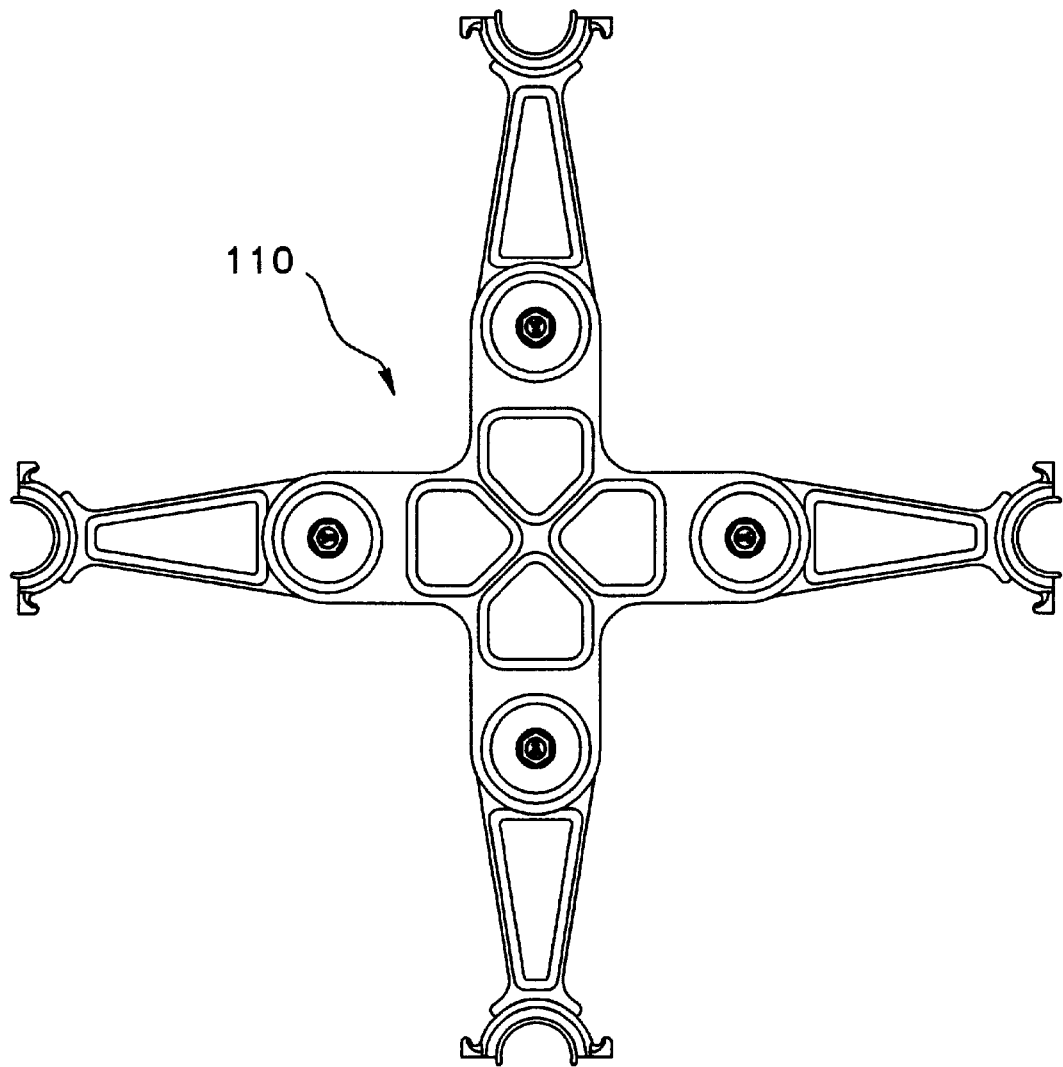
FIG. 22 is a front view of a spacer known in the prior art.

Referring now to FIG. 22, one can see a front view of a standard spacer 110. By virtue of its construction, this spacer electrically insulates the four conductors from each other but the insulation in question is insufficient if one wants to apply the present invention on relatively long line segments.

Referring to FIG. 23, one can see a spacer 112 where the insulating capacity thereof has been increased by making certain parts 114 with an insulating material such as, for example, a polymer or ceramic.

Referring now to FIG. 24, one can see a front view of another spacer 116 where the insulating capacity thereof has been increased by making a part 118 with an insulating material such as, for example, a polymer or ceramic.

Figure 25:
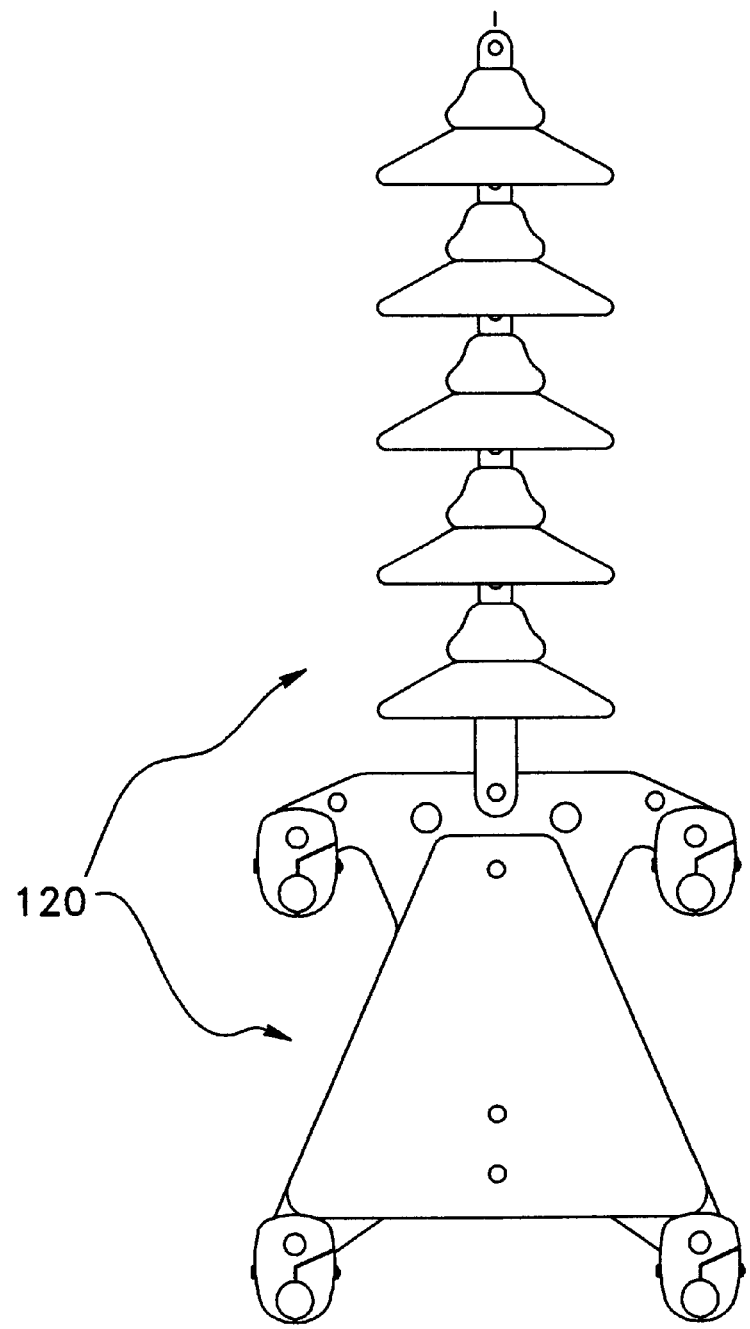
FIG. 25 is a front view of a yoke plate known in the prior art.

Referring now to FIG. 25, one can see a front view of a standard yoke plate 120. By virtue of its construction, this yoke plate which is mounted on the pylon, does not electrically insulate the four conductors from each other.

Referring now to FIG. 26, one can see a front view of a yoke plate 122 where the pins that support the conductors have been insulated by making certain parts 124 with an insulating material such as, for example, a polymeror ceramic.

Figure 27:
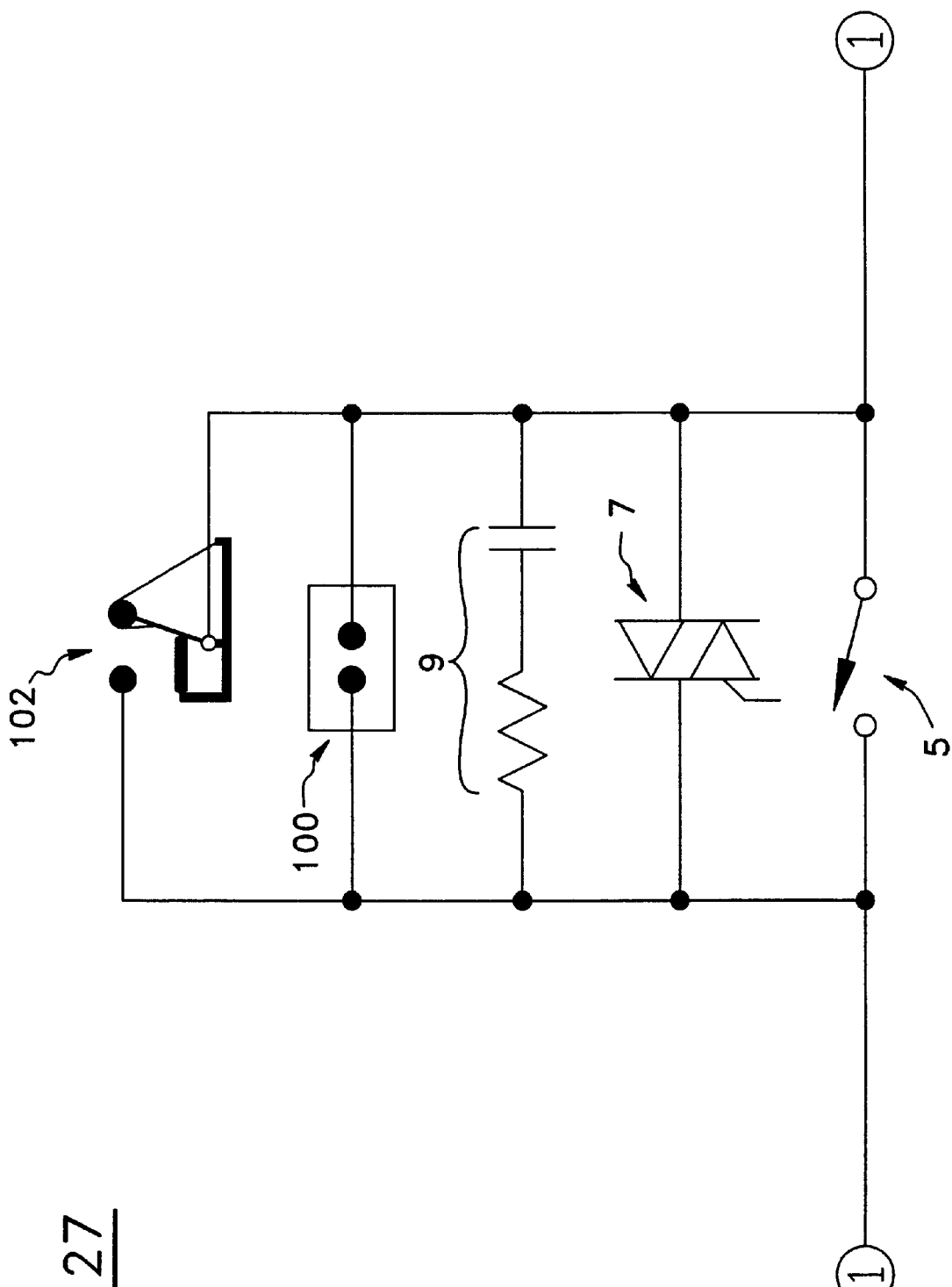
FIG. 27 is a schematic diagram circuit of a preferred embodiment of a pair of electromechanical and electronic switches according to the present invention.

Referring now to FIG. 27, one can see a preferred embodiment of a pair of switches 6 shown in FIGS. 1 to 5. This embodiment enables to protect the electronic and electromechanical switches 7 and 5. Thus, in parallel to the electronic and electromechanical switches 7 and 5, a semiconductor voltage clamp such as an avalanching diode or a varistor 100 has been added to ensure the conduction in case of over-voltage and the protection of the switches. Furthermore, to ensure the continuity of the line in case of a major problem, a thermal spark gap device 102 is connected in parallel with the switches. This device 102 becomes short-circuited if sufficient energy is dissipated to melt the retaining wire of the spring mechanism.

Figure 29:
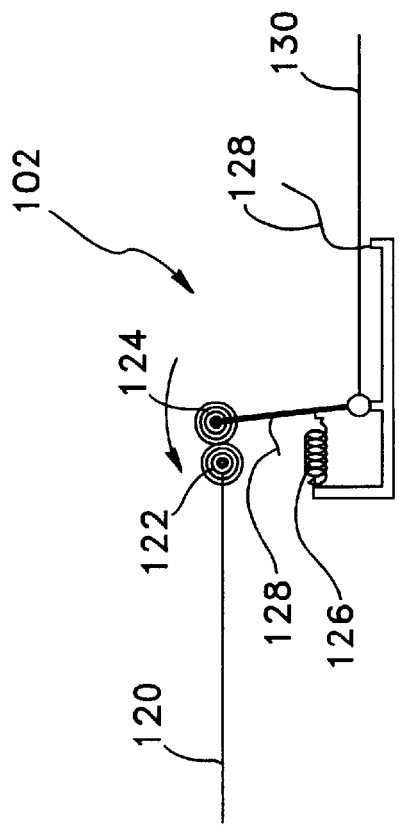
FIG. 29 is a conceptual side illustration of the thermal spark gap device shown in FIG. 26 in a second position.
Figure 28:
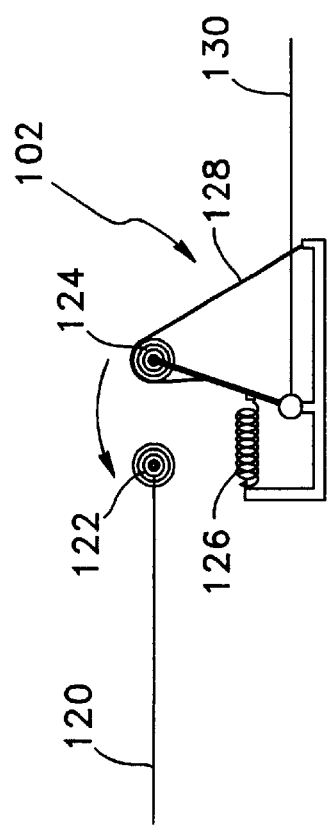
FIG. 28 is a conceptual side illustration of a thermal spark gap device shown in FIG. 26 in a first position. By thermal spark gap device we mean a device that, first, produces a spark when an overvoltage occurs at the terminals of an air gap, and, second, produces a short circuit of the air gap when the current produced by the arc exceeds a given threshold.

Referring now to FIGS. 28 and 29, one can see respectively the thermal spark gap device 102 in an armed position and in an activated position. The arrows shown in these figures indicate the moving direction of the mobile contact 124 when it closes. The device 102 comprises a fixed contact 122 linked to a conductor 120 and a mobile contact 124 linked to the conductor 130. The mobile contact 124 is held by a wire fuse 128 and is armed by means of a spring 126. When the current is sufficient, said current melts the wire fuse 128 which yields, and the spring 126 pushes the mobile contact 124 towards the fixed contact 122.

Figure 30:
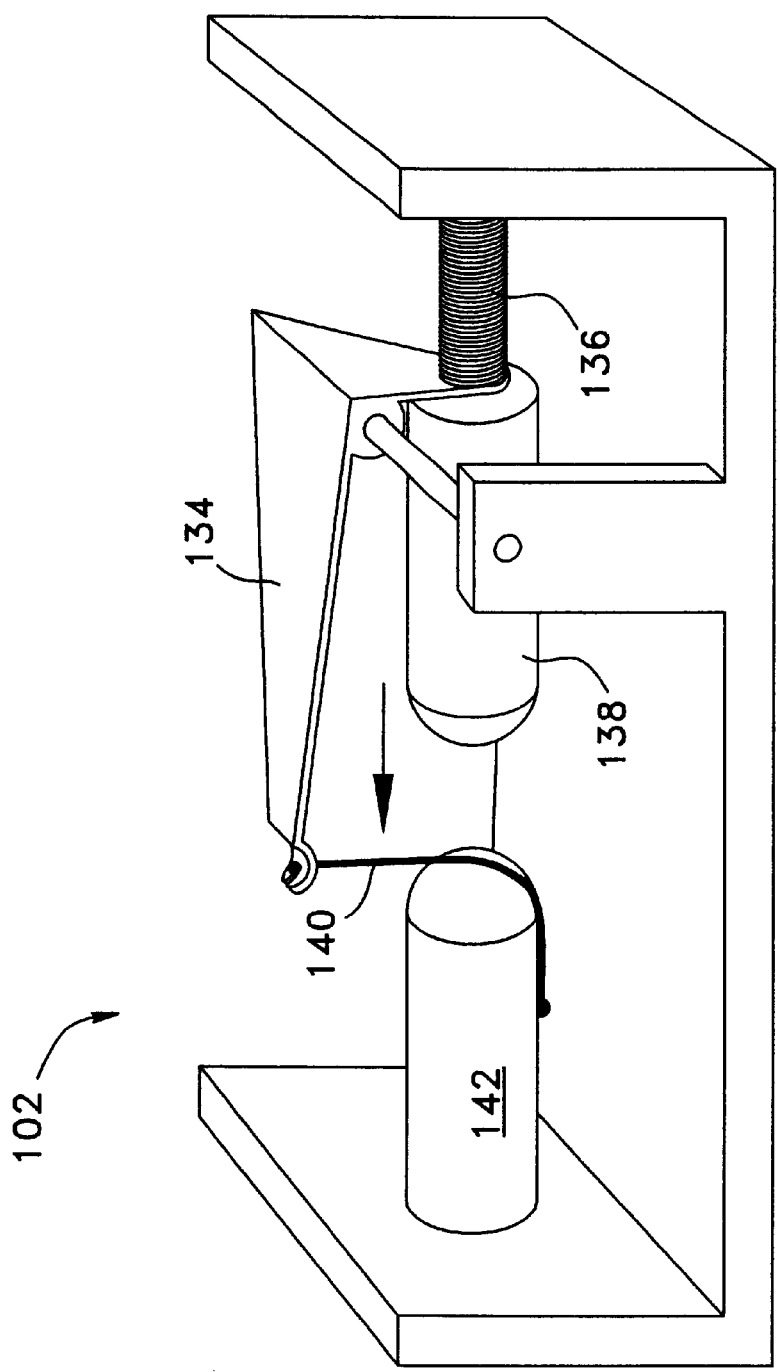
FIG. 30 is a conceptual perspective illustration of another thermal spark gap device according to the present invention.

Referring now to FIG. 30, one can see another embodiment of a thermal spark gap device 102. This device 102 comprises a fixed contact 142 and a mobile contact 138 which is held by a wire fuse 140 and a triggering handle 134. The mobile contact is armed by means of a spring 136. When the wire fuse yields, the spring 136 pushes the mobile contact 138 towards the fixed contact 142.

Figure 31:
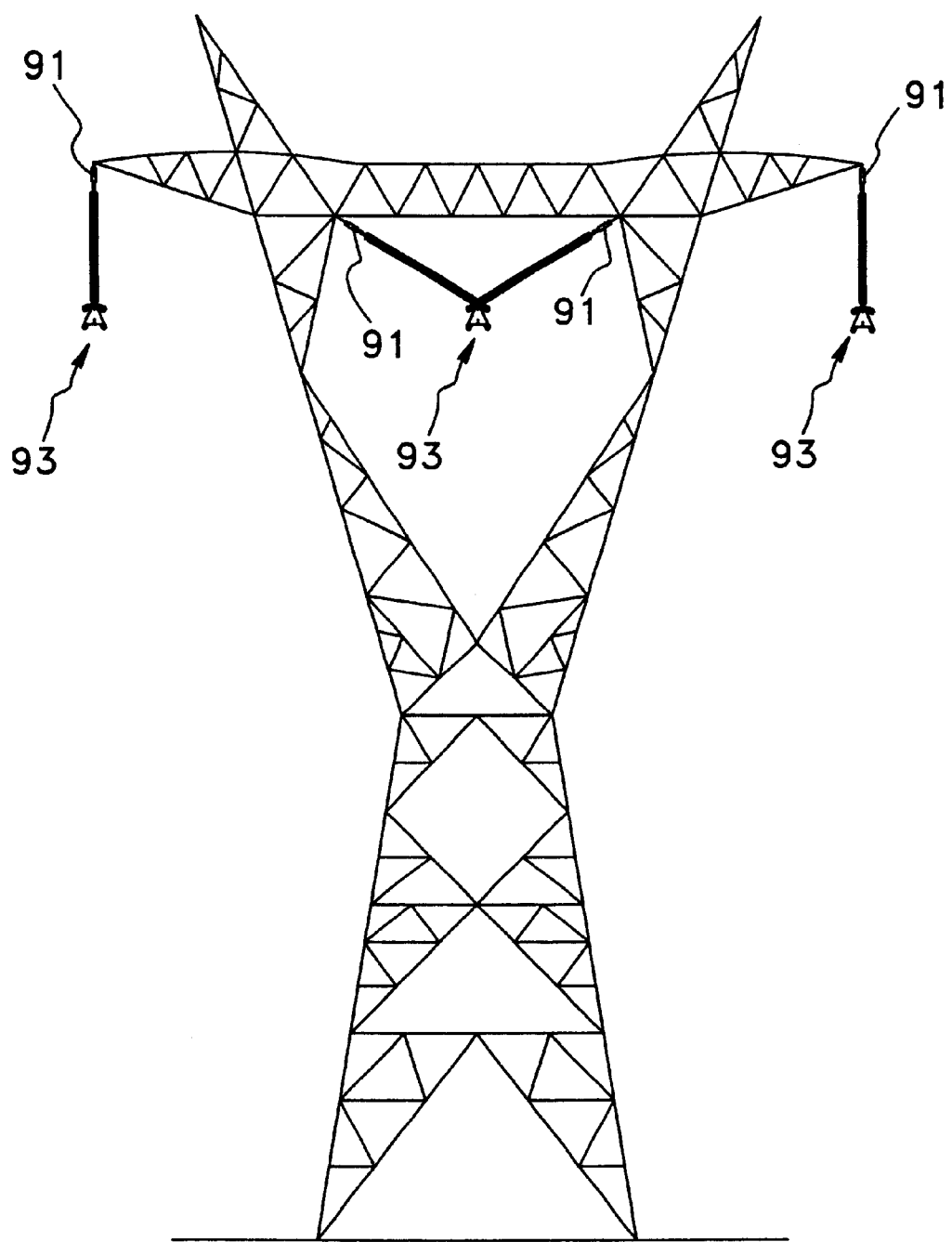
FIG. 31 is a front view of a pylon supporting an electric power line.

Referring now to FIG. 31, one can see another embodiment for mounting the load cells 91. These are mounted with respect to the yoke plate 93.

What is claimed is:

1. A switching apparatus for a segment of an electric power line having several phase lines, each of the phase lines having several conductors electrically insulated one from the other and connected in parallel for conducting a phase current, the conductors of each phase line being short-circuited among them at two ends of the segment, the apparatus comprising:

pairs of electromechanical and electronic switches connected in parallel, for selectively opening and closing the conductors of each phase line so as to conduct the corresponding phase current through one or several conductors;

detecting means for detecting current operating conditions of the segment of the electric power line; and control means for controlling the pairs of electromechanical and electronic switches according to the current operating conditions of the segment, the switches of each pair being independently controlled by control signals.

2. An apparatus according to claim 1, wherein the electromechanical switches of a same phase line are integrated in an electromechanical switching device which comprises:
- a housing;
- first terminals mounted on the housing and connected respectively to first sections of the conductors of the phase line;
- fixed conducting contacts connected to the first terminals;
- second terminals mounted on the housing and connected respectively to second sections of the conductors of the phase line;
- a mobile carriage capable of displacement with respect to the housing along a course, the carriage including mobile conducting contacts connected to the second terminals, the mobile conducting contacts having respectively partially discontinuous conducting surfaces disposed one with respect to the others so that all along the course at least one of the conductors of the phase line is closed by a connection between at least one of the mobile conducting contacts and at least one of the fixed conducting contacts;
- guiding means for guiding the carriage along its course; and
- motor means for moving the carriage along its course, the motor means being controlled by the control means.

3. An apparatus according to claim 2, wherein the guiding means comprise rails mounted on the housing, and linear bearings mounted on the carriage and capable of sliding along the rails.

4. An apparatus according to claim 2, comprising furthermore regulating means for regulating a movement of the carriage during its course, said regulating means comprising:
- a flexible spring rod having a first extremity connected to the carriage and a second extremity provided with a positioning component; and
- an elongated member mounted on the housing and provided with notches positioned in relation to the course of the carriage and capable of cooperating with the positioning component during the course of the carriage so as to stabilize said carriage in different operating positions.

5. An apparatus according to claim 2, comprising furthermore indicating means for indicating an actual operating position of the carriage, said indicating means comprising:
- a flexible spring rod having a first extremity connected to the carriage and a second extremity provided with an indicating component; and
- a part of an external wall of the housing, provided with holes positioned in relation to the course of the carriage and capable of cooperating with the indicating component during the course of the carriage so as to indicate to an observer external to the housing the actual operating position of the carriage.

6. An apparatus according to claim 2, wherein the motor means comprise:
- a motor mounted on the housing and controlled by control means;
- a speed reducer coupled to the motor;
- a lead screw having a first extremity connected to the speed reducer, and a second extremity fixed to an anchorage point of the housing;
- a barrel capable of moving along the lead screw, the barrel being linked to the carriage for moving said carriage when the motor is activated.

7. An apparatus according to claim 1, wherein the electromechanical switches of a same phase line are integrated in an electromechanical switching device which comprises:
- a housing;
- first terminals mounted on the housing and connected respectively to first sections of the conductors of the phase line;
- a mobile carriage capable of displacement with respect to the housing along a course, the carriage including mobile conducting contacts connected to the first terminals;
- second terminals mounted on the housing and connected respectively to second sections of the conductors of the phase line;
- fixed conducting contacts connected to the second terminals, the fixed conducting contacts having respectively partially discontinuous conducting surfaces disposed one with respect to the others so that all along the course at least one of the conductors of the phase line is closed by a connection between at least one of the mobile conducting contacts and at least one of the fixed conducting contacts;
- guiding means for guiding the carriage along its course; and
- motor means for moving the carriage along its course, the motor means being controlled by the control means.

8. An apparatus according to claim 3, wherein the guiding means comprise rails mounted on the housing, and linear bearings mounted on the carriage and capable of sliding along the rails.

9. An apparatus according to claim 7 comprising furthermore regulating means for regulating a movement of the carriage during its course, said regulating means comprising:
- a flexible spring rod having a first extremity connected to the carriage and a second extremity provided with a positioning component; and
- an elongated member mounted on the housing and provided with notches positioned in relation to the course of the carriage and capable of cooperating with the positioning component during the course of the carriage so as to stabilize said carriage in different operating positions.

10. An apparatus according to claim 7, comprising furthermore indicating means for indicating an actual operating position of the carriage, said indicating means comprising:
- a flexible spring rod having a first extremity connected to the carriage and a second extremity provided with an indicating component; and
- a part of an external wall of the housing, provided with holes positioned in relation to the course of the carriage and capable of cooperating with the indicating component during the course of the carriage so as to indicate to an observer external to the housing the actual operating position of the carriage.

11. An apparatus according to claim 7, wherein the motor means comprise:
- a motor mounted on the housing and controlled by the control means;
- a speed reducer coupled to the motor;
- a lead screw having a first extremity connected to the speed reducer, and a second extremity fixed to an anchorage point of the housing; and a barrel capable of moving along the lead screw, the barrel being linked to the carriage for moving said carriage when the motor is activated.

12. An apparatus according to claim 1, wherein:

the detecting means comprise:

several load cells, at least one load cell being mounted for every phase line, each load cell comprising a load sensor for measuring a load value supported by the corresponding phase line, an inclination sensor for measuring its inclination with respect to a vertical axis, a temperature sensor for measuring an ambient temperature, and a radiofrequency transmitter for transmitting signals indicating the value of the load, the inclination and the ambient temperature; and detecting means comprising:

a processor having first input ports for receiving signals indicating the operating positions of the switches, and second input ports for receiving signals indicating the voltages at the terminals of the pairs of switches;

a radiofrequency transmitter connected to the processor for transmitting signals indicating the operating positions of the switches, and of the voltages; and electric power supply means for supplying the processor and the transmitter;

the control means comprise:

the processor which has furthermore outputs for transmitting the control signals;

a radiofrequency receiver connected to the processor for receiving radiofrequency control signals from which the control signals are produced;

an amplifier connected to the processor for controlling the motor means according to the control signals; and the electric power supply means for supplying furthermore the receiver and the amplifier.

13. An apparatus according to claim 12, wherein the electric power supply means comprise:

a first electric power supply having a battery and a solar panel connected to the battery; and an electric power supply connected in parallel to the first electric power supply, and having inputs connected to the conductors.

14. An apparatus according to claim 1, comprising respectively, in parallel with each pair of switches, a damping circuit, a voltage clamp and a thermal spark gap device.

15. A switching method for a segment of an electric power line having several phase lines, each of the phase lines having several conductors electrically insulated one from the other and connected in parallel for conducting a phase current, the conductors of each phase line being short-circuited among them at two ends of the segment, the method comprising the following steps:

(a) detecting current operating conditions of the segment of the electric power line; and (b) controlling pairs of electromechanical and electronic switches connected in parallel according to operating conditions detected in step (a) for selectively opening and closing the conductors of each phase line so as to conduct the corresponding phase current through one or several conductors, the switches of each pair being independently controlled by control signals.

16. A method according to claim 15, wherein step (b) comprises the following steps:

(i) during a closing of a pair of switches, producing control signals causing a closing of the electronic switch before a closing of the electromechanical switch; and (ii) during an opening of a pair of switches, producing control signals causing an opening of the electromechanical switch before an opening of the electronic switch.

17. A method according to claim 15, wherein step (a) comprises the following steps:

(i) detecting operating positions of the switches;

(ii) measuring voltages at the terminals of the pairs of switches;

(iii) measuring for each phase line a load value that is supported by means of load cells, inclinations of the load cells with respect to a vertical axis, and temperatures ambient to the load cells;

(iv) transmitting radiofrequency signals indicating the operating positions of the switches, the voltages, the load values, the inclinations and the ambient temperatures;

(v) following step (iv), receiving radiofrequency control signals; and (vi) producing the control signals according to the radiofrequency control signals.

18. A method according to claim 15, wherein, in step (b), the pairs of electromechanical and electronic switches are controlled so as to conduct the phase current of each phase line through at least one of the corresponding electromechanical switches.

19. A method according to claim 18, wherein step (b) comprises the following steps:

(i) permanently opening electromechanical switches from predetermined pairs of switches associated to predetermined phase lines; and (ii) using the electronic switches of the predetermined pairs of switches to open and close the corresponding conductors.

* * * * *